United States Patent
Fowler et al.

(10) Patent No.: US 11,488,273 B2
(45) Date of Patent: Nov. 1, 2022

(54) SYSTEM AND PLATFORM FOR ENGAGING EDUCATIONAL INSTITUTIONS AND STAKEHOLDERS

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/660,826

(22) Filed: Apr. 26, 2022

(65) Prior Publication Data

US 2022/0253963 A1 Aug. 11, 2022

Related U.S. Application Data

(63) Continuation-in-part of application No. 17/446,298, filed on Aug. 29, 2021, which is a continuation-in-part of application No. 17/302,233, filed on Apr. 27, 2021, now Pat. No. 11,106,753.
(Continued)

(51) Int. Cl.
*G06F 7/00* (2006.01)
*G06Q 50/26* (2012.01)
(Continued)

(52) U.S. Cl.
CPC ....... *G06Q 50/265* (2013.01); *G06K 7/10297* (2013.01); *G06K 7/10366* (2013.01); *G06Q 50/205* (2013.01)

(58) Field of Classification Search
CPC ............... G06Q 50/265; G06Q 50/205; G06K 7/10297; G06K 7/10366
(Continued)

(56) References Cited

U.S. PATENT DOCUMENTS 6,144,304 A * 11/2000 Webb ................. G08B 21/0202
235/375
6,658,348 B2 * 12/2003 Rudd ...................... H04L 67/51
342/357.44
(Continued)

FOREIGN PATENT DOCUMENTS

EP 2254083 A1 11/2010
EP 2988260 A1 2/2016
(Continued)

OTHER PUBLICATIONS

International Search Report issued in International Application No. PCT/US2022/071913 dated Jun. 15, 2022.
(Continued)

*Primary Examiner* — Ahshik Kim
(74) *Attorney, Agent, or Firm* — Vos-IP, LLC

(57) ABSTRACT

A method for pushing a data within a template in an educational setting comprising: scanning, via a first user device, a first tag, said first user device having first a unique ID and said first tag being a master tag and comprising a first tag ID; scanning, via a second user device, a second tag, said second user device having a second unique ID and said second tag having a second tag ID and being controlled by said master tag; defining a template being loaded onto said second user device upon the scanning of the second tag; and wherein the template comprises data corresponding to said second tag ID, said second unique ID, and a time corresponding to the scanning of said second tag.

23 Claims, 12 Drawing Sheets

Related U.S. Application Data

(60) Provisional application No. 63/201,376, filed on Apr. 27, 2021, provisional application No. 63/201,373, filed on Apr. 27, 2021, provisional application No. 63/015,688, filed on Apr. 27, 2020.

(51) Int. Cl.
*G06K 7/10* (2006.01)
*G06Q 50/20* (2012.01)

(58) Field of Classification Search
USPC .......................................................... 707/758
See application file for complete search history.

(56) References Cited

U.S. PATENT DOCUMENTS

| | | | |
|---|---|---|---|
| 7,379,886 B1 | 5/2008 | Zaring et al. | |
| 7,587,214 B2 | 9/2009 | Inselberg | |
| 7,817,990 B2 | 10/2010 | Pamminger et al. | |
| 3,056,802 A1 | 11/2011 | Gressel et al. | |
| 8,494,838 B2 | 7/2013 | Donabedian et al. | |
| 8,731,583 B2 | 5/2014 | Wengrovitz | |
| 8,971,861 B2 | 3/2015 | Gupta et al. | |
| 9,002,727 B2 | 4/2015 | Horowitz et al. | |
| 9,117,231 B2 | 8/2015 | Rodgers et al. | |
| 9,201,470 B2 | 12/2015 | Kim et al. | |
| 9,223,750 B2 | 12/2015 | Liu et al. | |
| 9,223,885 B2 | 12/2015 | Marsico | |
| 9,324,079 B2 | 4/2016 | Moulin et al. | |
| 9,405,844 B2 | 8/2016 | Lim et al. | |
| 9,451,389 B2 | 9/2016 | Beg et al. | |
| 9,681,302 B2 | 6/2017 | Robinton et al. | |
| 9,767,645 B1 | 9/2017 | Cronin et al. | |
| 9,826,049 B2 | 11/2017 | Lim et al. | |
| 9,870,585 B2 | 1/2018 | Cronin et al. | |
| 9,883,344 B2 | 1/2018 | Bolton et al. | |
| 9,965,819 B1 | 5/2018 | DeVries | |
| 10,009,429 B2 | 6/2018 | Garccia Manchado | |
| 10,163,124 B2 | 12/2018 | Horowitz et al. | |
| 10,178,166 B2 | 1/2019 | Sharan | |
| 10,248,905 B1* | 4/2019 | Beatty | G06Q 50/20 |
| 10,942,913 B1 | 3/2021 | Khoyilar et al. | |
| 2001/0050310 A1 | 12/2001 | Rathus et al. | |
| 2002/0016816 A1 | 2/2002 | Rhoads | |
| 2003/0008661 A1 | 1/2003 | Joyce et al. | |
| 2003/0041155 A1 | 2/2003 | Nelson et al. | |
| 2006/0094409 A1 | 5/2006 | Inselberg | |
| 2007/0229217 A1 | 10/2007 | Chen et al. | |
| 2009/0085724 A1 | 4/2009 | Naressi et al. | |
| 2009/0138920 A1 | 5/2009 | Anandpura et al. | |
| 2009/0189982 A1 | 7/2009 | Tawiah | |
| 2010/0184462 A1 | 7/2010 | Lapstun et al. | |
| 2010/0228577 A1 | 9/2010 | Cunningham et al. | |
| 2010/0279710 A1 | 11/2010 | Dicke et al. | |
| 2011/0034252 A1 | 2/2011 | Morrison et al. | |
| 2012/0011015 A1 | 1/2012 | Singh et al. | |
| 2012/0130770 A1 | 5/2012 | Heffernan | |
| 2012/0233237 A1 | 9/2012 | Roa et al. | |
| 2012/0280784 A1 | 11/2012 | Gaviria Velez et al. | |
| 2013/0073366 A1 | 3/2013 | Heath | |
| 2013/0080218 A1 | 3/2013 | Wildern, IV et al. | |
| 2013/0085834 A1 | 4/2013 | Witherspoon, Jr. et al. | |
| 2013/0166384 A1 | 6/2013 | Das | |
| 2013/0218721 A1 | 8/2013 | Borhan et al. | |
| 2013/0275221 A1 | 10/2013 | Zeto, III et al. | |
| 2013/0297430 A1 | 11/2013 | Soergel | |
| 2013/0311214 A1 | 11/2013 | Marti et al. | |
| 2014/0039945 A1 | 2/2014 | Coady et al. | |
| 2014/0046802 A1 | 2/2014 | Hosein et al. | |
| 2014/0058886 A1 | 2/2014 | Gopalakrishnan et al. | |
| 2014/0156752 A1 | 6/2014 | Fetyko | |
| 2014/0279072 A1 | 9/2014 | Serino | |
| 2014/0282684 A1 | 9/2014 | Keen et al. | |
| 2014/0365574 A1 | 12/2014 | Franks et al. | |
| 2015/0067811 A1 | 3/2015 | Agnew et al. | |
| 2015/0073879 A1 | 3/2015 | Acosta-Cazaubon | |
| 2015/0081532 A1 | 3/2015 | Lewis et al. | |
| 2015/0088658 A1 | 3/2015 | Iiduka et al. | |
| 2015/0112704 A1 | 4/2015 | Braun | |
| 2015/0120388 A1 | 4/2015 | Tan et al. | |
| 2015/0161684 A1 | 6/2015 | Raikula | |
| 2015/0279164 A1 | 10/2015 | Miller et al. | |
| 2015/0294392 A1 | 10/2015 | Sharon et al. | |
| 2015/0296347 A1 | 10/2015 | Roth et al. | |
| 2015/0304601 A1 | 10/2015 | Hicks et al. | |
| 2015/0348329 A1 | 12/2015 | Carre et al. | |
| 2016/0086228 A1 | 3/2016 | Babb et al. | |
| 2016/0104041 A1 | 4/2016 | Bowers et al. | |
| 2016/0104347 A1 | 4/2016 | Yang | |
| 2016/0189287 A1 | 6/2016 | Van Meter | |
| 2016/0191821 A1 | 6/2016 | Dwarakanath et al. | |
| 2016/0217258 A1 | 7/2016 | Pitroda et al. | |
| 2016/0282619 A1 | 9/2016 | Oto et al. | |
| 2016/0307379 A1 | 10/2016 | Moore, Jr. et al. | |
| 2016/0335565 A1 | 11/2016 | Charriere et al. | |
| 2016/0381023 A1 | 12/2016 | Dulce et al. | |
| 2017/0039599 A1 | 2/2017 | Tunnell et al. | |
| 2017/0142460 A1 | 5/2017 | Yang et al. | |
| 2017/0330263 A1 | 11/2017 | Shaffer | |
| 2017/0337531 A1 | 11/2017 | Kohli | |
| 2018/0089775 A1 | 3/2018 | Frey et al. | |
| 2018/0288394 A1 | 10/2018 | Aizawa | |
| 2018/0330327 A1 | 11/2018 | Hertenstein et al. | |
| 2018/0336286 A1 | 11/2018 | Shah | |
| 2018/0353999 A1 | 12/2018 | McGillicuddy et al. | |
| 2018/0376217 A1 | 12/2018 | Kahng et al. | |
| 2019/0098504 A1 | 3/2019 | Van Betsbrugge et al. | |
| 2019/0130450 A1 | 5/2019 | Lamont | |
| 2019/0220715 A1 | 7/2019 | Park et al. | |
| 2019/0385128 A1 | 12/2019 | Cummings | |
| 2020/0035019 A1 | 1/2020 | Cappello et al. | |
| 2020/0104601 A1 | 4/2020 | Karoui et al. | |
| 2020/0184547 A1 | 6/2020 | Andon et al. | |
| 2020/0213006 A1 | 7/2020 | Graham et al. | |
| 2020/0236278 A1 | 7/2020 | Yeung et al. | |
| 2020/0320911 A1 | 10/2020 | Bruce | |
| 2020/0327997 A1 | 10/2020 | Behrens et al. | |
| 2020/0413152 A1 | 12/2020 | Todorovic et al. | |
| 2021/0019564 A1 | 1/2021 | Zhou et al. | |
| 2021/0027402 A1 | 1/2021 | Davis et al. | |
| 2021/0065256 A1 | 3/2021 | Shontz | |
| 2021/0118085 A1 | 4/2021 | Bushnell et al. | |
| 2021/0247947 A1 | 8/2021 | Jaynes et al. | |
| 2021/0248338 A1 | 8/2021 | Spivack et al. | |
| 2022/0114228 A1 | 4/2022 | Fowler et al. | |
| 2022/0167021 A1 | 5/2022 | French et al. | |
| 2022/0172128 A1 | 6/2022 | Lore | |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

International Search Report issued in International Application No. PCT/US2021/071461 dated Feb. 10, 2022.

International Search Report issued in International Application No. PCT/US2021/070471 dated Jun. 28, 2021.

International Search Report issued in International Application No. PCT/US2022/071909 dated Aug. 3, 2022.

International Search Report issued in International Application No. PCT/US2022/071912 dated Jul. 6, 2022.

(56) References Cited

OTHER PUBLICATIONS

International Search Report issued in International Application No. PCT/US2022/071938 dated Jul. 6, 2022.
International Search Report issued in International Application No. PCT/US2022/071906 dated Jul. 7, 2022.
International Search Report issued in International Application No. PCT/US2022/071910 dated Jul. 7, 2022.
International Search Report issued in International Application No. PCT/US2022/071908 dated Aug. 8, 2022.
International Search Report issued in International Application No. PCT/US2022/071915 dated Jul. 8, 2022.
"Blockchain", Wikipedia, Sep. 27, 2019.
"URL Redirection", Wikipedia, Mar. 21, 2021.
"Web Template System", Wikipedia, Mar. 2, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.

* cited by examiner

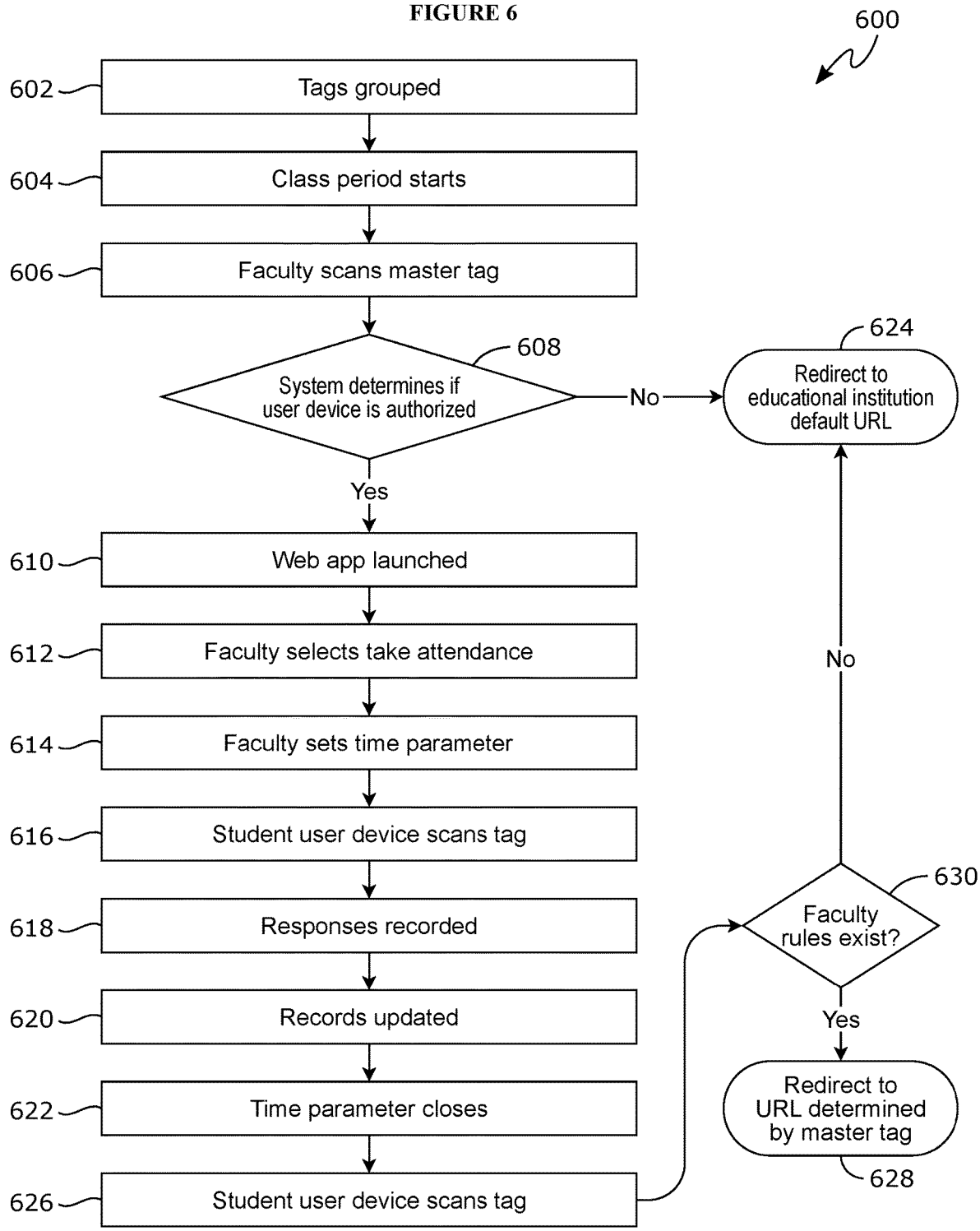

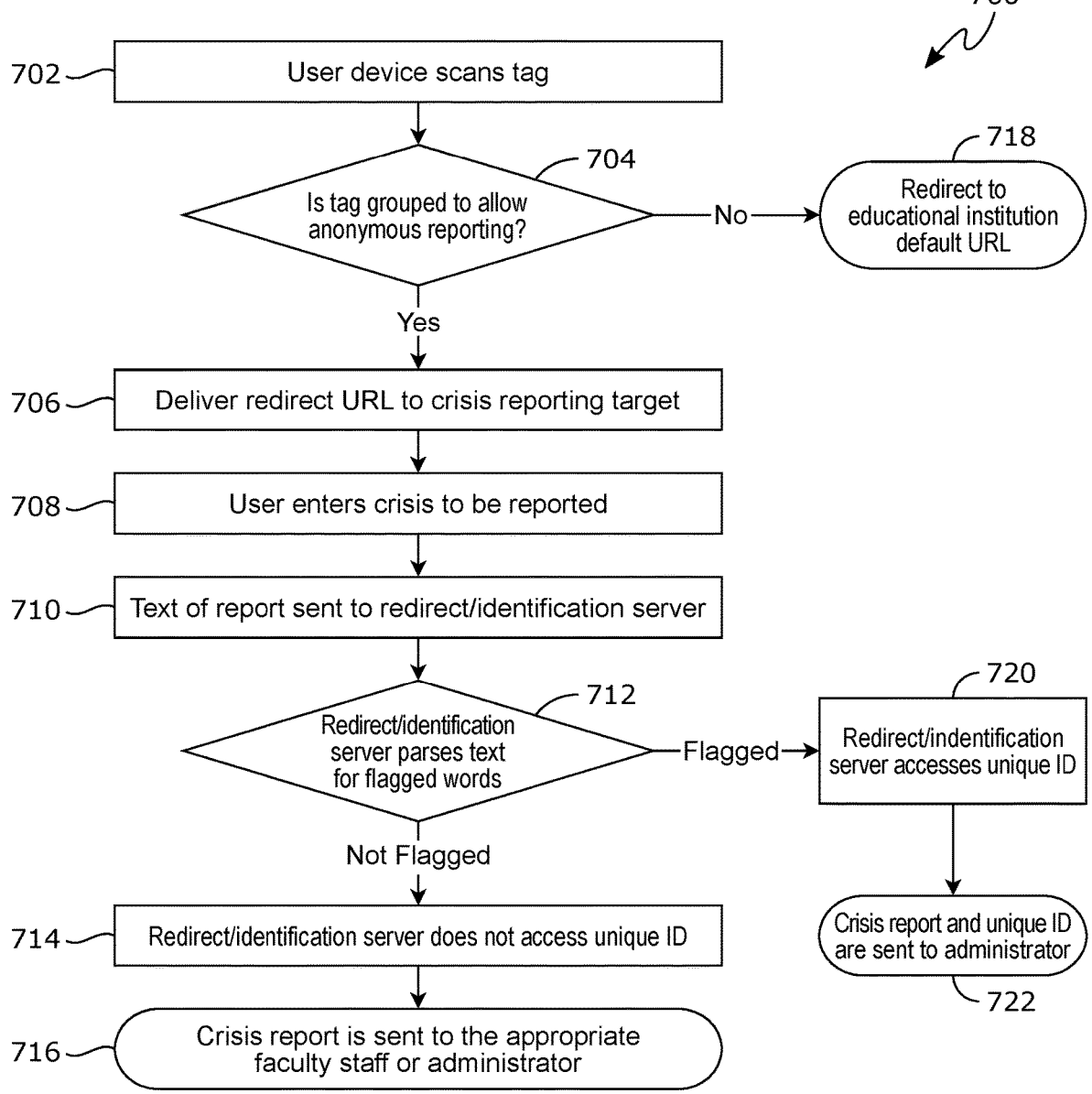

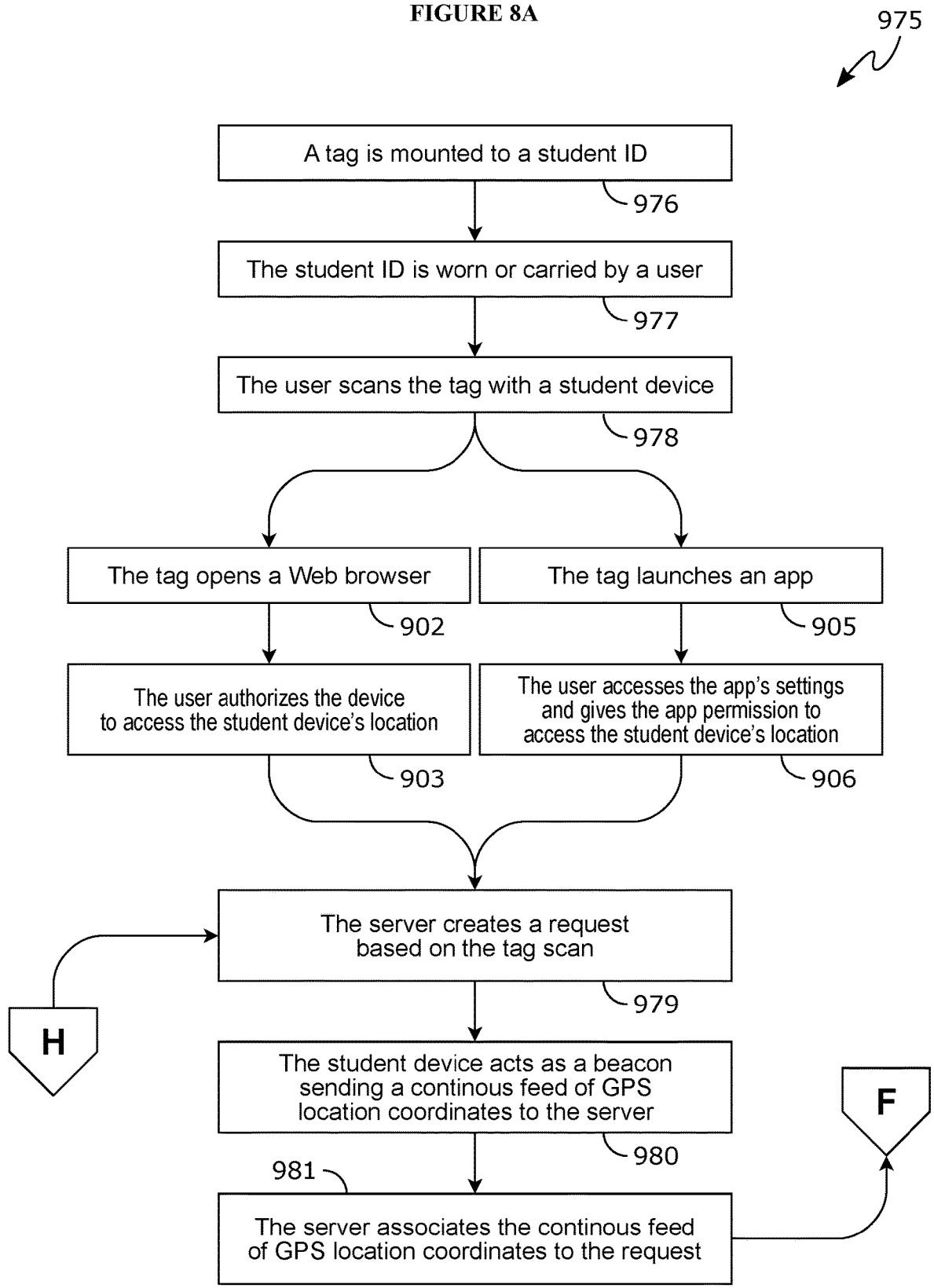

SYSTEM AND PLATFORM FOR ENGAGING EDUCATIONAL INSTITUTIONS AND STAKEHOLDERS

CROSS-REFERENCE TO RELATED APPLICATIONS

This application claims the benefit of U.S. Provisional Patent Application No. 63/201,376 filed on Apr. 27, 2021, U.S. Provisional Patent Application No. 63/201,373 filed on Apr. 27, 2021, and U.S. patent application Ser. No. 17/446,298 filed on Aug. 29, 2021, which is a continuation-in-part of U.S. patent application Ser. No. 17/302,233 filed on Apr. 27, 2021, which claims the benefit of U.S. Provisional Patent Application No. 63/015,688 filed on Apr. 27, 2020, all with the United States Patent and Trademark Office, the contents of which are incorporated herein by reference in their entirety.

FIELD OF THE INVENTION

The invention is related to platform systems and methods for engaging with educational institutions and their stakeholders through the use of tags comprising a machine-readable code and a user device.

BACKGROUND OF THE INVENTION

Educational institutions, whether it be a primary school, middle school, high school, college, university, trade school, boarding school, or military academy, are complex ecosystems comprised of diverse groups of stakeholders including students, faculty, staff, administrators, and parents. There is a need to disseminate relevant information to each of these groups efficiently that can be updated in real time. There is also need for stakeholders to have a centralized system that connects all aspects of the ecosystem with verifiable access.

The ecosystem starts with basic academic instruction and the need to provide all stakeholders with to access things like grades, attendance, assignments, school calendars, unexpected school closures, emergency messaging systems and other pertinent information and to facilitate communications between students, parents, faculty, and administration. While these things currently exist, they typically do so on a Web site that the stakeholder must navigate and often require one or more logins to access sensitive information. For example, a student or parent may need to log into one system to access grades and another system to access attendance.

Educational institutions do more than deliver academic instruction to students. They provide counseling to students on issues including bullying, relationships, social interactions, home life, domestic abuse, substance abuse, assault, depression, anxiety, and suicide. Many times, students are hesitant to seek these counseling for sensitive topics as they require the student to meet with a staff member in a physical location drawing attention to the fact that the student is seeking counseling or they may be hesitant to report a fellow student struggling with abuse or depression if they cannot do so anonymously for fear of retaliation.

Educational institutions also need a way to facilitate communication between internal and external stakeholders. For example, it is advantageous for a high school, college, university, or trade school to seamlessly integrate with external businesses to connect students with jobs or internships. It's also desirable for a high school to employ a system that facilitates the college recruiting process and provides a mechanism to alert students of scholarship opportunities.

The ecosystem extends to extracurricular activities such as sports, theatre, music, volunteer opportunities and the like. Extracurricular activities are typically tied to an event and that event has specific content that the educational institution wants to make available. For example, the educational institution may want to make the current roster available to a sports team or deliver a digital program for a theatrical performance.

Computing devices, such as smart phones, smart watches, tablets, and laptop computers have become ubiquitous in educational institutions, particularly with the student population where the use of smart phones and other devices is adopted as early as kindergarten. Likewise, other stakeholder groups have access to these devices. Educational institutions typically have internet and mobile networks readily available making it easy for computing devices to connect to them. Likewise, machine-readable codes ("MRC") have become ubiquitous in society and computing devices frequently are built with embedded MRC readers.

The need exists then for an elegant way to provide relevant, targeted and real time content to all categories of stakeholders of an educational institution with the ability to bifurcate the content so that verified stakeholders receive a level of access not available to unverified stakeholder; to make access to the content available using ubiquitous methods such as scanning and MRC; and to deliver the content to devices that are readily available to all stakeholders such as a computing device like a smart phone.

SUMMARY OF THE INVENTION

The embodiments herein are related to systems and methods for engaging with educational institutions, wherein the stakeholders, including but not limited students, faculty, parents, administrators, etc., engaged within the system by scanning a tag. The act of scanning a tag from a user device, detects the presence of a unique ID on the user device, and confirms the presence of a database entry comprising the unique ID. Wherein, the system provides interactive content to all stakeholders based upon formatting of rules within the system.

A system for reporting a health or safety issue comprising: (a) a server system comprising a computer processor, a database, and at least one server; at least one tag; and at least one unique user device having a unique ID; and (b) wherein in response to the user device scanning the tag, the server system performs the following method: (i) receiving a request from the user device at a server, said server detecting whether the at least one tag is grouped to allow an anonymous report; (ii) if yes, delivering a redirect URL to the user device; (iii) reporting a health or safety issue to the server; (iv) parsing, from reporting the health or safety issue, information and determining presence or absence of a flagged word or phrase; (v) upon the presence of the flagged word or phrase, appending the unique ID to the report; and (vi) reporting the health or safety issue to an appropriate administrator.

The system wherein upon the absence of the flagged word or phrase, no unique ID is appended to the report.

The system wherein the system comprises a graphical user interface (GUI), wherein the GUI identifies one or more issues which are populated in said GUI as an executable button; upon an executable button being pressed, determining if the report is flagged for anonymous or nonanonymous reporting; and reporting the health or safety issue.

The system wherein the tag comprises an MRC (17a) and wherein the tag is located on a student ID, wherein the system (10) associates the unique ID (22a) located on the user device with a resource record for a unique tag ID associated with the MRC (17a) on the student ID (290).

The system wherein a geolocation of the user device is provided.

The system wherein the system generates an automatic reminder on said user device at a predetermined time.

The system wherein upon reporting of a health or safety issue, the report is provided to emergency services.

The system wherein the report is provided to the administrator.

A method of taking attendance within an educational setting comprising: (a) scanning, via a user device, a first tag, said user device having a unique ID and said first tag comprising a tag ID; (b) determining a time of the scanning; (c) determining, from a database, a schedule corresponding to the unique ID; and (d) marking, within the database, the unique ID as being present at a given time for a given tag ID.

The method wherein the scanning via a user device locks the user device. The method wherein the scanning via a user device further directs the user device to a template.

The method wherein the first tag is located on a student ID, wherein the user device comprises a copy of the unique ID (22a), and wherein a resource record for the tag ID is associated with an MRC (17a) on the student ID (290).

The method wherein a template is defined by the time and the unique ID.

The method further comprising a second tag, said second tag being a master tag, wherein scanning of the second tag opens a window for the scanning of the first tag by the user device.

The method wherein the first tag is located on a door, a wall, a desk, a bus, or a student ID.

The method wherein attendance is counted when the first tag is scanned a first time for marking the user device present and scanned a second time to mark the user device as absent. The method wherein the first tag is located on a school bus.

The method wherein after scanning by the user device, said user device is pushed a template notification.

A method for taking attendance within an education setting comprising: (a) scanning, via a first user device, a first tag, said first user device having a unique ID and said first tag being a master tag and comprising a tag ID; (b) determining, from a database, at least a second tag, said second tag being controlled by the master tag; (c) receiving from a second user device, a scan from said at least second tag; and (d) updating a database, with a scan record comprising a time and a unique ID corresponding to the second user device.

The method wherein the scanning of the at least second tag by the second user device locks the user device.

The method wherein the second tag is present on a student ID.

The method wherein the second tag is present within a classroom.

The method wherein the second user device is pushed a template upon scanning of the second tag.

The method wherein the scanning by the second user device provides a geolocation of the second user device. The method wherein the second tag is present on a vehicle.

A method for pushing a data within a template in an educational setting comprising: (a) scanning, via a first user device, a first tag, said first user device having first a unique ID and said first tag being a master tag and comprising a first tag ID; (b) scanning, via a second user device, a second tag, said second user device having a second unique ID, and said second tag having a second tag ID and being controlled by said master tag; (c) defining a template being loaded onto said second user device upon the scanning of the second tag; and (d) wherein the template comprises data corresponding to said second tag ID, said second unique ID, and a time corresponding to the scanning of said second tag.

The method further comprising pushing the data to said second user device within the template.

The method wherein scanning via the first user device creates a database entry defining the start of a class period and opening a time period wherein the scanning of a second tag by a second user device marks the second unique ID as present at the time of the scanning by the second user device.

The method wherein the scanning of a second tag by the second user device locks the second user device.

The method wherein the second user device rescans the second tag and the rescanning of the second tag redirects the second user device to a template.

The method wherein the scanning of the second tag by the second user device defines the time, wherein a database defines the time and the unique ID and deploys the correct template to the second user device.

The method wherein a third user device scans the second tag, and wherein the third user device is pushed information relating to an owner of the second tag.

The method wherein the second tag is on a student ID, and wherein the unique ID (22a) is associated with a resource record for a unique tag ID associated with an MRC (17a) on the student ID (290).

A method of reporting a safety issue and providing a geolocation comprising: (a) scanning, via a first user device, a first tag, said first user device having a unique ID and said first tag comprising a tag ID, and defining a time; (b) determining at the time a geolocation for said first user device; (c) displaying, on said first user device, a template defining a graphical user interface (GUI) defining at least one selection regarding the reporting of an issue; (d) selecting from said GUI an issue; and (e) directing a report to an administrator, said report corresponding to said reporting of an issue.

The method wherein the issue is determined to be an anonymous reporting issue wherein the unique ID is not transferred within a metadata within said report or a nonanonymous reporting issue wherein the unique ID is transferred within the metadata within said report. The method wherein the determination of anonymous or nonanonymous reporting is determined based upon the GUI selection.

The method further comprising a text box wherein text is provided to report an issue. The method wherein the determination of anonymous or nonanonymous reporting is determined from one or more key words within said text.

A system for providing an interactive digital student platform comprising: (a) a plurality of machine-readable codes (MRCs), each machine-readable code (MRC) in the plurality having a unique MRC identifier; (b) a server having a computer processor and a computer memory; (c) a database operatively connected to the server, the database containing information relating to each MRC in the plurality of MRCs, the information relating to each MRC including: (i) the unique MRC identifier associated with the MRC; and (ii) a pointer to a template for the interactive digital student platform associated with the unique MRC identifier; and (d) wherein the computer memory of the server stores executable code which when executed enables the server to perform a process comprising: (i) in response to receiving a request from a user device, identifying the template for the interactive digital student platform associated with the MRC that was scanned by a user device; (ii) populating the identified template with dynamic content items; (iii) sending the populated version of the interactive digital student platform to the user device; and (iv) updating at least one dynamic content item on the user device in real time.

The system wherein dynamically updating includes receiving updated information and sending the updated information to the user device to update the interactive digital student platform. The system wherein dynamically updating at regular intervals is provided at the end of each class period. The system wherein dynamically updating includes identifying a trigger and pushing additional content to the interactive digital student platform in response to the trigger. The system wherein dynamically updating includes reaching a threshold and unlocking a piece of content in response to reaching the threshold.

The system wherein the plurality of MRCs includes a plurality of scannable tags selected from the group consisting of: quick response code tags, near-field communication (NFC) tags, radio-frequency identification (RFID) tags, and combinations thereof.

The system comprising pushing to said user device a notification regarding a job offer, a tutoring offer, an updated grade, a test reminder, a game reminder, a practice reminder, or combinations thereof.

BRIEF DESCRIPTION OF THE FIGURES

FIG. 6 depicts an embodiment of a system wherein the system is enabled to record attendance.

FIG. 7 depicts an embodiment of a system wherein the system is enabled to receive anonymous reports.

FIGS. 8A, 8B and 8C depict a flowchart regarding a tag mounted on a movable device wherein the mobile device becomes a beacon for location positioning.

DETAILED DESCRIPTION OF THE INVENTION

Figure 1:
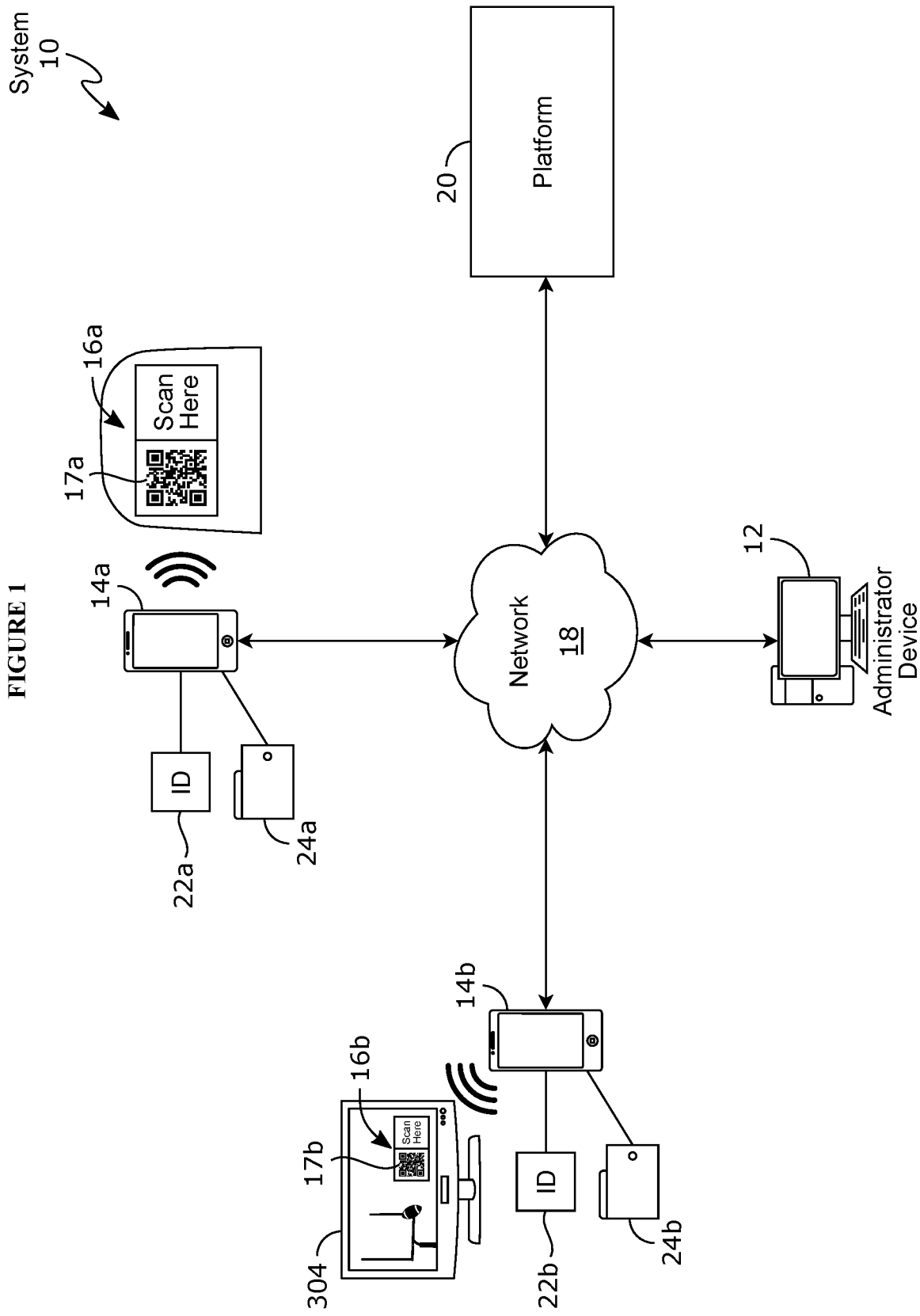
FIG. 1 depicts an embodiment of a system for user device generated interactions with a system and platform for engaging educational institutions and stakeholders.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

ADDRESS: Code used to direct a user device, browser, Web app, progressive Web app, administrator device, server, database, API, tool, software, etc., to a resource within the system or a network. Non-limiting examples of addresses include a uniform resource identifier (URI) or a uniform resource locator (URL).

ADMINISTRATOR: The individual or group of individuals with the ability to control and set rules and parameters within the system. This could be a third-party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Non-limiting examples of analytical data include date, time, GPS location, personal identifying information, etc.

APPLICATION PROGRAMMING INTERFACE ("API"): An application programing interface or programming code that enables data transmission within the system, between the system's server and an external server or between one software product and another. Non-limiting examples of API connections to the system may be third-party vendor databases such as ticketing sales platforms, e-commerce sites such as merchandise sales, social media sites, or any other third-party software product that makes their API available for use by others.

API CALL—Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language-Remote Procedure Calls ("XML-RPC"); (iv) JSON Remote Procedure Calls ("JSON-RPC), (v) open API; (vi) partner API; (viii) internal or private API; (ix) composite API; or (x) any other API that is generally known, or will be come to be known in the art. Thus, the system frequently uses an API, or sends an API request, to an internal or external program, server, or database to deliver requested information.

BLOCKCHAIN: Any digitally distributed, decentralized, public or private ledger that exists across a network such as those offered by the providers including but not limited to Ethereum, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a Web site.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Non-limiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dogecoin, etc.

DATABASE MANAGEMENT SYSTEM: A software package designed to define, manipulate, retrieve, and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A Digital offer can be code stored in the user's digital wallet, an MRC displayed in Web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A non-limiting example of a dynamic element is the score of a game. If a goal is completed, then the score is updated to reflect this change.

EVENT: Non-limiting examples of an event include a professional, amateur or intermural sporting events (i.e., football, baseball, hockey, basketball, soccer, rugby or cricket game, tennis or golf match, track and field or figure skating event or automobile race), a theatrical performance (play, musical, or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

STUDENT PORTAL: A GUI, such as a homepage, displayed in the browser of a user device that provides links or access to other pages/modules via buttons or other means of selecting options from a menu of choices. The student portal can also be used for viewing content and receiving digital offers.

INTERFACE SERVER: Within the system, a program, executable code, or API stored on a physical server, cloud storage system or in a serverless environment such as Amazon Web Services, which is capable of communicating with other servers, databases and API's internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the user's device, such as but not limited to an interface to the Web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Non-limiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, saleable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT and can also mean semi-fungible token or fractional NFT. Non-limiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Non-limiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Non-limiting examples of a request can be—GET, POST, PUT, DELETE, CONNECT, OPTIONS.

RULE: A set of conditional statements that tells the system how to react to a particular situation. Rules can be prepogramed into the system or can be set or changed by an administrator or proprietor.

SYSTEM: The network, tags, platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pennsylvania and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, Web app, progressive Web app, portal, content, or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to materialize. Triggers can be determined either by the system, an administrator, or a proprietor. Non-limiting examples of a trigger can be the start or end of an event, something of significance that occurs during the event (i.e., the tenth goal scored, the first encore by a musical act), a single user completing a certain task, or n number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials, or it can be a digital certificate such as TLS, SSL, code signing certificate, client certificate, etc. . . . The unique ID can be stored on the user device in any location on the user device such as the manifest, local storage, or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

UNIQUE USER RECORD: The unique user record contains information about the user (demographics, event attendance history, purchasing history) as well as information about the user device (type of device, GPS location of the device when is scans an MRC).

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

USER/DEVICE RECORD: A record stored within a database on a server that contains the unique ID and unique identifying information associated with that unique ID for each user that accesses the system. The user/device record can contain an unlimited amount of information about the user device and presumably the user who owns the user device such as, but not limited to a history of events attended, digital offers used, gambling wagers made, NFTs minted or purchased, venues or locations visited, concession or merchandise purchases, donations made, incident reports, tags scanned, other actions taken, etc.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle, or high school) or a college campus or dorm.

WEB APP: Executable code that is stored on a remote server and delivered via the system or a network to a browser interface on a user device. The Web app may facilitate communication between the user device and one or more servers such as the redirect/identification server or the interface server.

Overview

The system (10) provides a unique solution for allowing users to access secure content without creating a username, password or profile and is able to deliver unique and specific content to each individual user. The system (10) allows each educational institution to custom tailor the system to address its unique individual needs and to sell advertising space as the educational institution deems appropriate.

A high-level overview of an exemplary system (10) is shown in FIG. 1. The system (10) may include an administrator device (12), a platform (20), a user device (14a) associated with an event user (e.g., physically at the educational institution such as in the classroom or on the campus), a user device (14b) associated with a remote user (e.g., not necessarily at the educational institution), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of a Web page or the like (e.g., related to the event) by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

An educational institution may use a network of encoded tags (16a, 16b) to identify aspects of the educational institution deemed to be points of interest (e.g., locations, objects, people, etc.). The number of tags (16a, 16b) in the network and placement of tags on, in, or near points of interest is at the discretion of the educational institution to fit its particular assets and needs. Further, an educational institution may add to or subtract from the number of tags (16a, 16b) in the network at will. Thus, the number of tags (16a, 16b) in an educational institution's network may be dynamic, either more or less than an original network of tags. Each tag (16a, 16b) in the network of tags has a unique identifier (tag ID), which may be used to identify a particular point of interest. For example, a tag (16a, 16b) may be situated on or near a desk in a classroom interior. In certain embodiments, it may be possible to have multiple copies of the same tag, each with the same tag ID, in locations where multiple scans would be desirable at the same time by multiple users. Thus, at the entrance to a building or a classroom, a plurality of tags could be located at different entrance points, each having the same tag ID.

As is implied in FIG. 1, a certain number of tags (16a) may be present at the educational institution ("on campus tag"), and additional one or more tags (16b) may be remote from the educational institution ("remote tag") where the MRC (17b) is displayed in/on a video transmission, signal, or the like, or on a Web page associated with the educational institution, as a few non-limiting examples. Of course, there is the possibility that a user at the educational institution scans the remote tag (16b) with his/her user device (14a). Each user device (14a, 14b) may also include, or may eventually include, a unique identifier (22a, 22b) to uniquely identify the user device (14a, 14b), a digital wallet (24a, 24b) to securely store sensitive information such as a driver's licenses, account information (e.g., banks, crypto currencies, credit cards), titles, tokens, tickets, vouchers, coupons, other digital file (301a, 301b), and the like.

The educational institution may also access platform (20), albeit via the administrator device (12) and one or more networks (18). The administrative device may be located at the educational institution, or it may be at a location remote from the educational institution. Generally, the proprietor may access a proprietor portal (FIG. 3 at [322]) hosted by platform (20) to perform administrative and/or other activities such as determining what content (or other) will be sent to the user device (14a, 14b) in response to scanning a tag (16a, 16b).

In addition to hosting the proprietor portal, platform (20) may host a variety of other services including, without limitation, on-campus user and remote user access to content associated with the educational institution, and the like. As such, platform (20) may include, or may include access to, one or more servers, databases, application programming interfaces (APIs), artificial intelligence/machine learning algorithms, other algorithms, code, blockchains, blockchain platforms, geofences, third-party integrations, times stamp, and more, which is detailed below, with reference to accompanying figures.

As was mentioned with respect to FIG. 1, each tag (16a, 16b) in the system (10) has a machine-readable code (17a, 17b) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected, or otherwise decoded (collectively, "scanned") by an appropriately enabled (e.g., camera, QR scanner, and/or NFC reader [212]) user device (14a, 14b).

On campus tags (16a) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on an interactive display (204), or a display screen associated with the on-campus user's student desk (208), other locations/point of interest, or combinations thereof. Thus, the on-campus tag (16a) may be a video display, such as LCD, LED, e-ink, or other visual display and/or text accompanying the MRC (17a).

Information encoded on or in each tag in the system (10) may include an address to direct a request (e.g., for a Web page) from the user device (14a, 14b) to a server or the like on the network (18) such as a server on platform (20). The address may be in the form of a uniform resource identifier (URI) such as a uniform resource locator (URL), according to a non-limiting embodiment. In this way, when the user scans the tag (16a, 16b) with the user device (14a, 14b), the user device (14a, 14b) sends a request to the appropriate network (18) location. In the example shown in FIG. 3, when the on-campus user uses his/her user device (14a) to scan tag (16a), the event user device (14a) obtains an address from the MRC (17a) associated with the scanned tag (16a) and sends a request via the network (18) to the address destination. As one example, the address is a URL that causes the event user device (14a) to send a request to a redirect/identification server (302), on platform (20), which receives the request. Similarly, when the remote user uses his/her user device (14b) to scan the MRC (17b) on a screen (304), a similar URL is obtained which causes the request from the remote user device (14b) to be sent to the redirect/identification server (302), which receives the request.

In a typical embodiment, each tag (16a, 16b) in the plurality has a unique tag identification number (i.e., "tag ID"), which may be appended to the URI/URL, although embodiments are not so limited. The tag ID may be used by the platform (20) for several reasons, one of which is to identify a point of interest/location associated with the tag (14a, 14b) via a tag ID lookup. For example, when a request comes from the event user device (14a), the platform (20) knows the location or identity of the request and the location of the tag, when on a student seat, or knows that a tag on a student ID, or other tag has been scanned. In an embodiment, the tag ID may be appended to the URL (or URI) such as by one or more parameters, pattern matching techniques, or other such mechanism for encoding information in a URI, URL and/or browser request.

Figure 3:
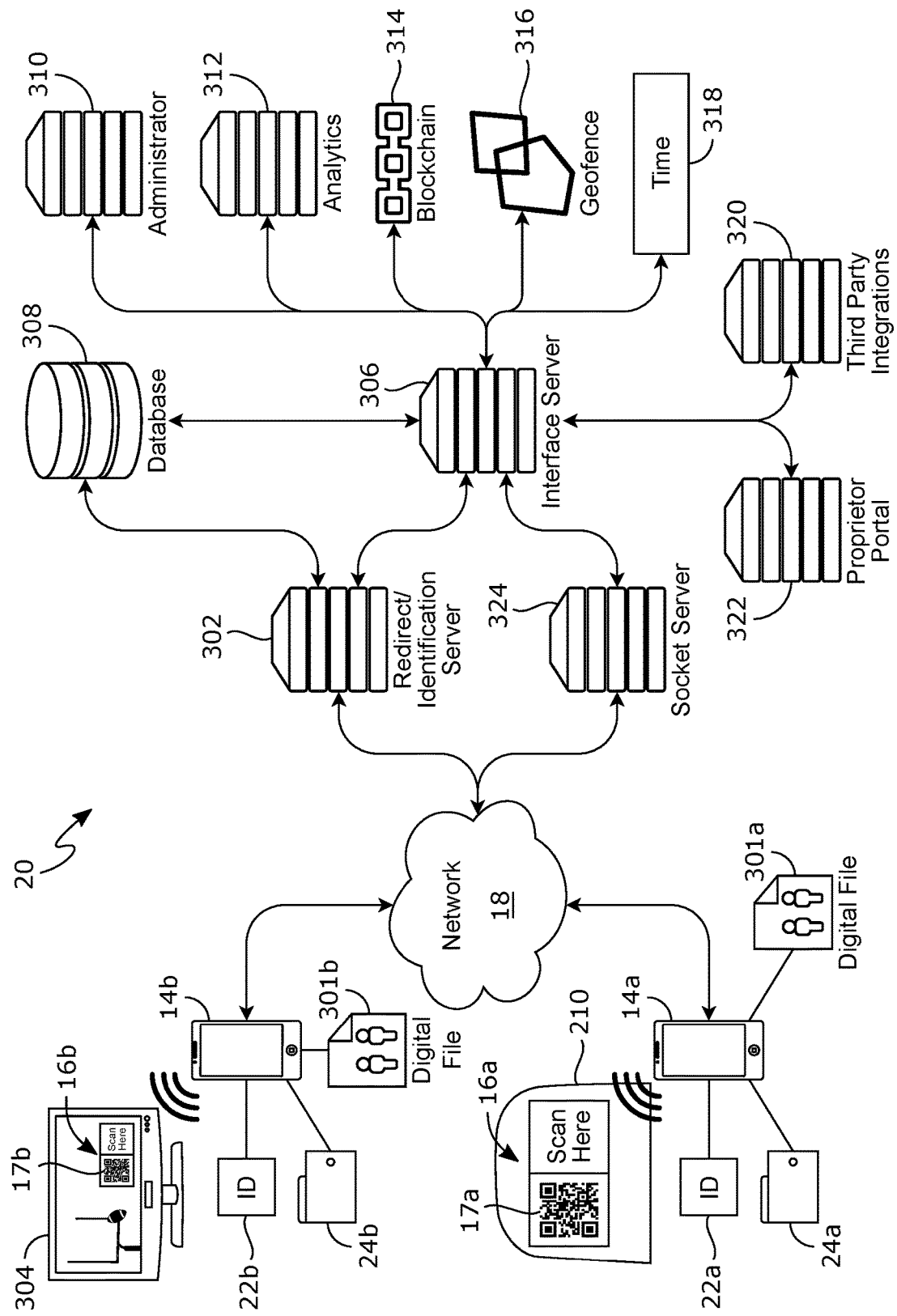
FIG. 3 depicts an embodiment of a system for accessing target information from a user device from within a venue or outside of an educational institution and various back-end platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), an analytics server (312), a blockchain, access to a blockchain, or both (314), a geofence (316) a timestamp (318), one or more third-party integrations (320), the proprietor portal (322), and a socket server (324). Generally, user device (14a, 14b) communicates with the platform (20) via redirect/identification server (302) as was previously described. Redirect/identification server (302), accept requests from user devices (14a, 14b), sends responses to user devices (14a, 14b), and performs various other methods as described herein. As one non-limiting example, the redirect/identification server (302) may forward information (e.g., URLs, parameters, etc.), from user device (14a, 14b) requests to the interface server (306). The interface server (306) manages most, if not all the tasks involved with processing requests, such as handing off/directing tasks, functions, calls, and the like where needed. The interface server (306) may also return request responses to the redirect/identification server (302). If a request came from a user device (14a or 14b), then the redirect/identification server (302) forwards the response to the requesting user device (14a or 14b). Examples of tasks, functions, calls, and the like that the interface server (306) may hand off include, without limitation, database (308)/blockchain storage, lookups, etc., administrative and back-end tasks/functions to the administration server (310), analytical tasks/functions to the analytics server (312), geolocation tasks/functions (316), time/timestamps (318), API calls to third-party servers for third-party integrations (320) and establishing socket connections via socket server (324).

Figure 4:
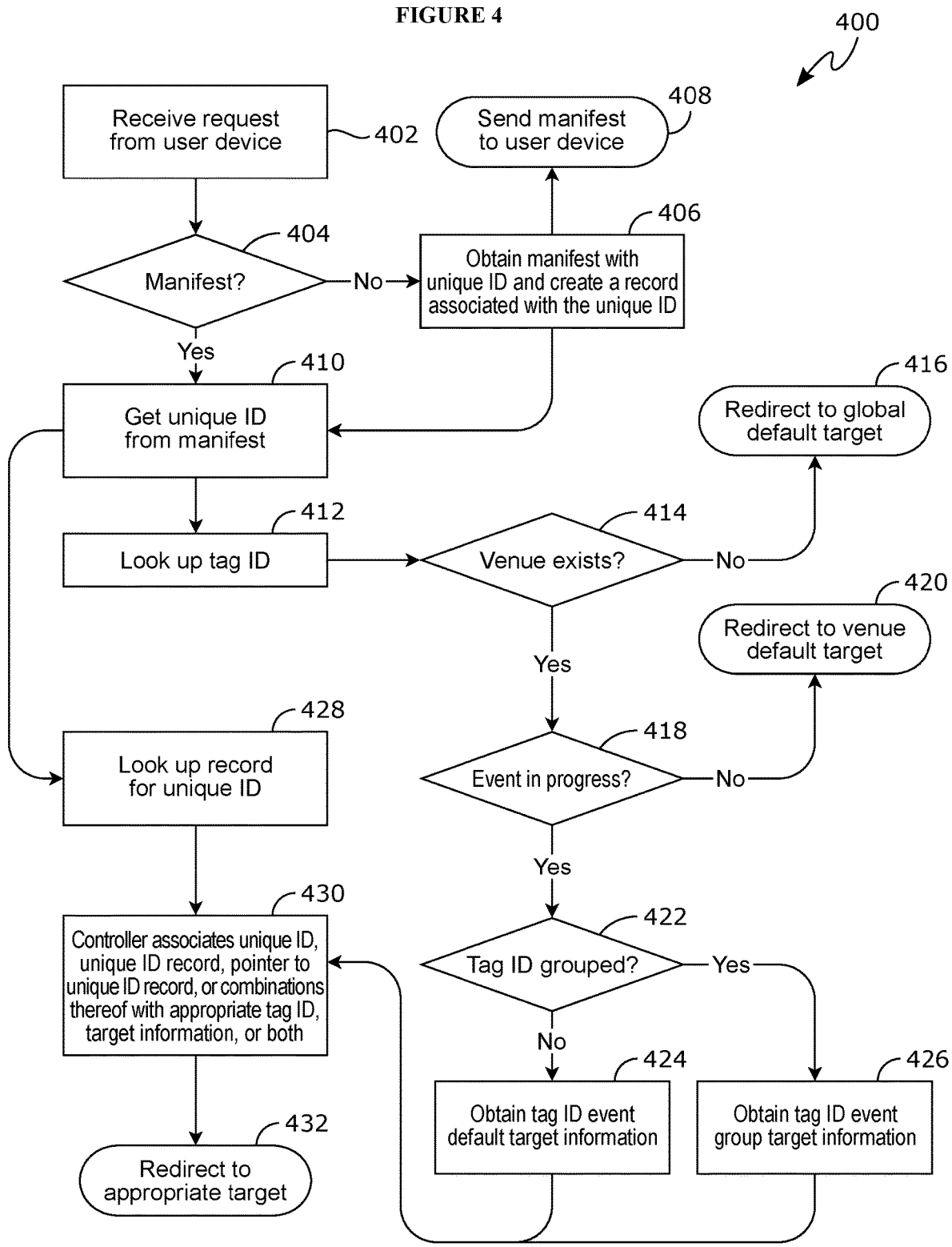
FIG. 4 depicts an embodiment of a system for identifying and using information particular to a user device and/or to a tag for directing the user device to an appropriate target.

Referring to FIGS. 3 and 4 together and using the request from on-campus user device (16a) as an example, a method (400) may begin with the redirect/identification server (302) receiving the request (step 402) from the on-campus user device (14a). From there, the redirect/identification server (302) may check to see if the on-campus user device (14a) has a manifest (containing the unique ID, or just the unique ID alone) loaded thereon (step 404). If no, the redirect/ identification server (302) may obtain a manifest and assign a unique ID (e.g., from database [308]) for the on-campus user device (14a, step 406). The manifest includes a unique ID to identify the on-campus user device (14a) with an identifier that is not shared with any other user device (e.g., 14b). The redirect/identification server (302) will also cause the unique ID for the on-campus user device (14a) to be stored in a database such, as database (308), as is appropriate for the database management system (step 406). As used herein, the term "record" refers to information that is stored in an electronic or other intangible medium without limitations on how the data is structured. A record may include and/or point to related data. For example, a record for a unique ID may include the unique ID and any other data related thereto, which may be stored in database (308) or other appropriate data storage. After obtaining the manifest and/or the unique ID, the redirect/identification server (302) may then send the manifest together with the unique ID to the on-campus user device (14a, step 408), which may be maintained on the on-campus user device (14a) in a digital wallet, other secure repository, or both. At step (410), the redirect/identification server (302) may maintain a copy of the unique ID for further use in the method (400), other methods described herein, or both. If the on-campus user device (14a) already has a manifest (step 404, yes), the redirect/identification server (302) obtains the unique ID from the manifest (step 410). In an embodiment, the redirect/identification server (302) may also obtain data such as current time, date, location, etc. from the on-campus user device (14a), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the on-campus user device (14a). In an embodiment, the tag ID is appended to the URL, and thus the entire URL, or a portion thereof, may be passed to the interface server (306) for use in looking up the tag ID. Looking up the tag ID provides information about the classroom interior (202). To clarify, when a classroom interior (202) installs tags (16a) and/or uses tags (16b), the tag IDs for the installed/used tags (16a, 16b) are associated with the point/location of interest and the particular classroom interior (202). Thus, if a tag is installed on a given student desk (208), database (308) information associates the installed tag's (16a) tag ID and that particular student desk (208), which is in that particular classroom interior (202). Since the tag ID is known to belong to a particular classroom interior (202), the interface server (306), the administration server (310) via the interface server (306), any other suitable server, or combinations thereof makes a series of determinations using the tag ID, which was received in response to a request from a user device (14a, 14b) prompted by scanning the tag (16a, 16b). One determination is if the classroom interior (202) is actively implementing platform (20) services (step 414). For example, the classroom interior (202) may have tags (16a) installed but it is no longer using the tags (16a), or it is not using the tags for a particular class period. If not, the on-campus user device (14a) is redirected to a global default target (step 416) that may inform the on-campus user that the services are no longer available, are temporarily out of service, or the like. If the classroom interior (202) is actively implementing platform (20) services, the method (400) may make another determination. At step (418), the method (400) may determine if a particular class is currently (or soon to be) in progress, or recently ended. In an embodiment, a class may be determined to be in progress based on the time that the class is scheduled to begin. Since many classroom interiors (202) open before the actual class period begins, and close after the actual class period ends, the window set for a class to be in progress may encompass a given amount of time before and after the actual activity begins/ends. In an embodiment, the time that the "class in progress" determination is made (step 418) may be recorded to serve as a timestamp to approximate the time that the on-campus user device (14a) scanned the tag (16a). In other words, the unique ID, tag ID, and time determination may be recorded for later use, in certain embodiments. If the class is not in progress, the on campus user device (14a) may be redirected to an educational institution default target (step 420) such as a Web page for the educational institution, or another Web page such as a page to identify that an incident has occurred in the classroom interior (202) at the location at which the tag (16a) was scanned. Incidents may encompass any sort of incident such as a need for something to be cleaned up to calling emergency services.

If the event is in progress, the method (400) may also determine if the tag ID belongs to a grouping of tag IDs (step 422). Tags (16a, 16b) may be grouped for many reasons and in many different ways. Tags (16a, 16b) may also belong to more than one group. As one non-limiting example, in the classroom interior of FIG. 2, the tags (16a) may be grouped. If data associated with the tag ID indicates that the tag belongs to a group, the on-campus user device (14a) may be redirected to a target for the particular group. For instance, the target for a group of students in the "advanced" focus group in a class may receive a different target than those in the "regular" focus group, wherein the Web pages may provide different content or features. Thus, the method (400) obtains the information it needs to enable redirection to the appropriate group target (step 426). If data associated with the tag ID indicates that the tag does not belong to a specific group, the on-campus user device (14a) may be redirected to a class default target such as a standard Web page for the class. Thus, the method (400) obtains the information it needs to enable the redirection (step 424) to the default target for the class. In an embodiment, the information needed for redirection may include a URL for the target with parameters, values, patterns, or the like appended thereto such as a target ID to identify the target and the tag ID.

Method (400) may simultaneously process other data such as looking up one or more records associated with the unique ID (step 428). In embodiments, the platform (20) may gather information relating to user activities via the user device and unique ID. For example, the platform (20) may gather data relating to tags that the user has scanned in the past (across a variety of different classes, venues, or the like) and activities associated with those tag scans (e.g., purchases made, content looked at, coupons downloaded, offers made or received, jobs pursued, colleges applied, tutoring performed or received, etc.), although embodiments are not limited thereto. This data may be stored in association with the unique ID assigned to the on-campus user device (14a). Thereafter, a controller may associate the unique ID, its record, its record location or the like with the tag ID, target ID, a URL, any other determined information, or combinations thereof (step 430). The on-campus user device (14a) may then be redirected to the appropriate target that has been determined for the on-campus user device (14a).

When a request comes from a remote user device (14*b*), the method (400) starts out essentially the same as with the on-campus user device (14*a*). That is, the redirect/identification server (302) receives the request (step 402), checks for a manifest containing a unique ID (step 404), assigns a manifest with a unique ID if one has not yet been assigned (step 406), and sends it to the remote user device (14*b*, step 408) for secure storage thereon. If the remote user device (14*b*) has a manifest, then the redirect/identification server (302) obtains it (and other information such as a unique ID) from the remote user device (14*b*). Either way, the redirect/identification server (302) has the information that it needs such as unique ID, URL, tag ID, and the like, and forwards the information to the interface server (306) to continue the method (400). The interface server (306) may then look up, or cause to look up, the record associated with the unique ID (step 428) assigned to the remote user device (14*b*). At the same time, the interface server (306) may cause a determination to be as to whether the educational institution exists (step 414). In this case the interface server (306), or other server, may look at the data associated with the tag ID to determine from where the tag (16*b*) that was scanned originated. For example, the MRC (17*b*) may have originated from a particular signal, transmission, etc., Web site (e.g., for the venue, a streaming service, etc.) or the like. If, the method (400) determines that the educational institution or class does not exist, for example, if the tag is to an unrelated element, then the remote user device (14*b*) is redirected to that unrelated element or to a global default target (step 416), for example if the tag is related. Assuming that the educational institution in this case does exist, the interface server (306)/method (400), then determines whether the class is in progress (step 418). If the signal, transmission, Web page, or the like is transmitting a class as it is occurring in real time then the class is in progress. Such can also be determined by a time stamp or time record set within the system. Either way, in an embodiment, the time the determination is made may be recorded by the platform (20). If the class is not occurring in real time (e.g., the user is watching a recording after the fact, such as a recorded class lecture), then the remote user device (14*b*) will be redirected to an appropriate target such as a Web page relating to the class (step 420). However, the educational institution can set any time parameter to define "real time." For example, an educational institution may desire to allow recordings watched within N number of days of a live event to constitute real time. The interface server (306) may then determine if the tag (16*b*), via the tag ID belongs to a group (step 422). For instance, different tags (16*b*) may be associated with different signals, transmissions, Web sites, or the like. Some of these tags (16*b*) may form groups based on predetermined criteria. Thus, if the tag (16*b*) belongs to a group, the remote user device (14*a*) will be redirected to the target for the appropriate group, and if not, the remote user device (14*a*) will be redirected to the default target. The default target for remote users may or may not be the same default for event users. Either way, the information relating to the determined redirection target is obtained (steps 424, 426). At step (430), a controller may associate the unique ID, the record for the unique ID, a pointer to the record for the unique ID, the tag ID, and target information such as a URL, target ID, or both. Thereafter, the remote user device (14*b*) is redirected to the appropriate target (step 432), as was described with respect to the on-campus user. In certain embodiments, the step of (428) may be provided in parallel to or concurrent with the lookup of the tag ID (step 412), where the unique ID is necessary for determining any of the other elements. Furthermore, the unique ID may be stored, for example in local memory or cache, which is readily accessible or known to the system after step (410).

In an embodiment, the user device (14*a*, 14*b*) may receive a redirect URL from the redirect/identification server (302) at the end of method (400) to redirect the user device (14*a*, 14*b*) to the appropriate target. For instance, the method (400) may return a target ID to identify the particular target. The target ID, tag ID, unique ID (and/or information associated therewith), or combinations thereof may be appended to the redirect URL for the target, which is sent to the requesting user device (14*a*, 14*b*). The requesting user device (14*a*, 14*b*) then uses the redirect URL to send a new request, this time for the target, which is received by the redirect/identification server (302) and is forwarded to the interface server (306) for processing. Alternatively, the target ID, tag ID, and unique ID may be used by the platform (20) without sending a redirect URL to the requesting device at the end of method (400). Regardless of the forgoing, the requesting user device (14*a* and/or 14*b*) receives the target of the redirection whatever that target may be. For example, a target may be a static Web page, a dynamic Web page, an application delivered by way of one or more Web pages, files, data, information, or combinations thereof. As one non-limiting example, the student portal (218) (but this could be a portal directed to any of the stakeholders of the educational institution) may have been the target identified by the target ID, and it may include application code "wrapped" or embedded in in an HTML document. Application code includes, but is not limited to, Web application code, progressive Web application code, cloud-based application code, native application code, native mobile application code, other such code, or combinations thereof. The HTML document (and cascading style sheet, etc.) generally determines the format/layout of what the user sees as is known in the art. The student portal (218) may have one or more buttons such as the content button (220).

Furthermore, targets are not necessarily static. In fact, the same tag (e.g., 16*a*) may cause a user device (e.g., 14*a*) to be redirected to distinct targets depending upon when the particular tag (16*a*) is scanned. For example, a classroom interior (202) hosts many classes over the course of a day, marking period, semester, year, decade, etc. Each class may have its own target as the individual events are distinct. For example, the student portal (218) may be the target of a class in progress or an event occurring at the educational institution. During the first period of the day, a freshman English class is scheduled to be held in the classroom interior (202) and thus the student portal (218) may be populated with buttons and content related to an English class. However, during the second period of the day, a sophomore math class is scheduled to be held in the classroom interior (202) and therefore a different student portal (218) is launched with buttons and content related to a math class. In other words, the two student portals (218) are distinct targets for redirection. The target that is reached by scanning the tag (16*a*) is coordinated with targets, such as via a distinct target ID, so that the user device (14*a*) is redirected to the freshman English student portal (218) during the first period and the same user device (14*a*) can be redirected to the sophomore math student portal (218) during the second period even though the exact same tag (16*a*) is scanned by the exact same user device (14*a*). Of course, this is one non-limiting example. A single tag (16*a*) may be used by an educational institution to redirect a user device (14*a*, 14*b*) to any desired target. Thus, the target to which the user device (14*a*) is redirected may be changed at any time.

An educational institution may also change, or allow its faculty to change, a target during the course of a particular class, event, or at any time. For example, referring again to the student portal (218) shown in FIG. 2, the user may use the student portal (218) to partake in activities such as being counted for attendance, accessing grades, viewing the schedule, accessing content, or entering a crisis report, etc. However, at any time during the educational institution can change the target, for example, the principal may want to deliver a recorded message to all stakeholders and therefore by scanning a tag (16a, 16b) the target for the recorded message is delivered to the user device. Thus, the term "target" should be broadly construed although it may be described herein with respect to obtaining a student portal (218) or other specific examples. One of ordinary skill in the art would understand a target of redirection as described herein may be a multitude of different targets with various purposes, designs, capabilities, and the like. Therefore, the target to which a particular tag (16a, 16b) is assigned, may be changed by simply changing the target identifier ("target ID") associated therewith.

There may be instances where the content delivered via the target may need to be changed, updated, altered, released, opened, or other such stipulations based on a rule and/or other conditions. Rules may be defined to force a modification of content already delivered, deliver additional content, information, data, release content, and/or make other such changes as would be appreciated by one skilled in the art. In this non-limiting example, the target delivered at (432) FIG. 4 includes a Web application, such as a progressive Web application (PWA), that has a pull function, which may be rule-based. The pull function, as one non-limiting example, may be time based, requesting information to be pulled from the platform (20) via the interface server (306) every 10 seconds, minutes, N seconds, N minutes or the like. As another non-limiting example, the pull function has the ability to have data updated on a rolling basis. The platform (20), however, may push rolling data to a user device (14a, 14b) instead of having it pulled from the platform. Pushed data may be sent to user devices (e.g., 14a, 14b) without being requested. Data may be pushed to a user device (14a, 14b) for any number of reasons, a few of which are detailed herein. Thus, information, data, etc., may be pushed to a user device (14a, 14b), pulled for a user device (14a, 14b), or both. In many instances, a Web application or the like may be based on a template having dynamic elements embedded therein. The contents of such dynamic elements may be altered via push techniques, pull techniques, or both. Content, data, information, and the like, may be pushed and/or pulled via a socket connect utilizing a socket server (324) or any other socket connection, communication connection, protocol, or combinations thereof as is available to the platform (20) under a set of given circumstances.

Figure 5:
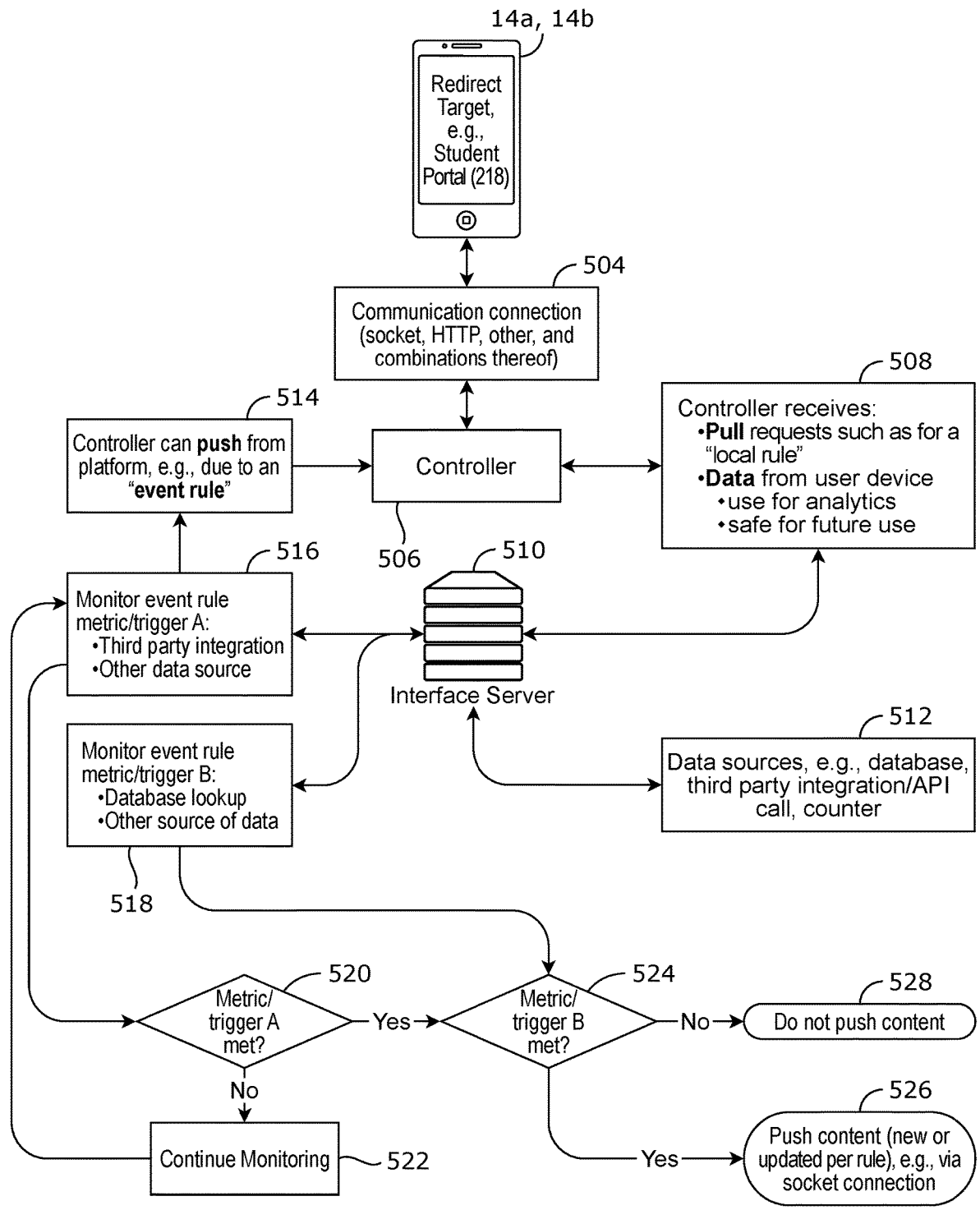
FIG. 5 depicts an embodiment of a system wherein the system is enabled to push or pull data or information or due to triggering events or rules to modify or augment a target delivered to a user device.

The method detailed in FIG. 5 may be invoked while the target of redirection (e.g., student portal [218]) is loading on the requesting user device (e.g., 14a and/or 14b), after the target is already loaded on the requesting user device (14a and/or 14b), or both. As with all methods detailed herein, steps in the method (500) may be used in whole or in part, in the order shown or a different order, be executed on one device or more than one device, be used in combination with some/all of the other methods described herein or as is known in the art, or combinations thereof.

Using student portal (218) as a non-limiting example while referring to FIG. 5, oftentimes it may be desired to alter information, regardless of type (e.g., video, images, instructions, etc.), while the user is using the student portal (218). Information may be altered using push, pull, and other techniques, taking advantage of the communication connection (504). The communication connection (504), which may be a socket connection or any other appropriate type of connection, allows communications between the user device (14a and/or 14b) and the platform (20) via the one or more networks (18). A controller (at 506) may be a set of software code for managing, directing, or generally being in charge of one or more rules, enabling pushing and/or pulling of information per the rules. In this example, rules may be used to change content on the user device (14a and/or 14b). The interface server at (510) may be the same interface server shown in FIG. 3 (306), just at the data sources at (512) may be the same data sources shown in FIG. 3 such as database (308), administrator server (310), analytics server (312), blockchain (314), geofence (316), time (318), third party integrations (320), and proprietor portal (322), without limitation. Moreover, interface server at (510) may facilitate utilization of the forgoing, in the same manner or similar manner as described with respect to FIG. 3. Thus, in a sense, user device (14a or 14b), communication connection (504), interface server (510), and data sources (512) are shown in FIG. 5 just to help the reader visualize interactions detailed in FIG. 5.

Examples of rules that are detailed with respect to FIG. 5 include educational institution rules and local rules, although embodiments are not so limited. Generally, an educational institution rule is monitored by the platform (20) and if satisfied causes data to be pushed to one or more user devices (14a, 14b) and a local rule, when invoked, causes a user device (14a, 14b) to request data (i.e., pulls data) from the platform (20). An illustrative example of an educational institution rule is if there is snow in the weather forecast, push content, such as a message implementing a snow emergency plan to all user devices (14a, 14b) that have scanned tags (16a, 16b). Here, the metric or trigger of the rule can be monitored (step 516) such as by directly sending a request or query to a data source (at 512) (i.e., monitor the API of the national weather service for snow emergency alerts) via the interface server (at 510), receiving data from the data source (at 512) on a regular basis such as every 5 seconds, 5 minutes, or the like (via the interface sever [at 510]), or combinations of both. The platform (20) may to monitor for the metric/trigger e.g., a snow warning (step 520) and continue to do so (step 522) until a metric/trigger e.g., the snow warning has been issued by the national weather service (step 520, yes). If the rule has been satisfied, the platform (20), can push the content to all of the qualifying user devices (i.e., that have scanned a tag [16a, 16b]).

A more complex event rule may include more than one trigger/metric. For example, the rule may be that if the national weather service issues a snow alert, push a message to all students signed up to take the SATs the next day, a message saying the SAT's will be rescheduled to all students that have used their user device (14a) to scan a tag (16a) at the educational institution. The first metric/trigger of whether the national weather service has issued a snow alert may be monitored as described above. The second metric/trigger may be monitored (at 518, 524) in the same or similar manner if the metric/trigger warrants, or it may be determined before or after the first trigger/metric has been satisfied. For example, since in this example the second metric/trigger relates to students signed up to take the SATs, a query may be sent to one or more data sources (at 512) to find all users who have registered for the SATs. Records stored on database (308), for example, may be consulted to look for scheduling data in connection with unique ID data to determine if the person who has loaded the student portal (218) on his/her device (14*a*) has registered for the SATs. As an alternative source of data or for any other reason, the interface server (at 510) may cause another data source (at 512) to be consulted to determine this information. For example, one or more third-party integrations (320) may have age information; thus, an API call or other query may be made to the third-party integrations (320) to obtain SAT registration data. As with the first example, if the first metric/trigger (step 520, no) is not met (i.e., a snow emergency alert), then the platform (20) continues to monitor the metric/trigger (step 522). If the metric/trigger (step 520, yes) has been met the platform (20) determines if the second metric/trigger (518) has also been met (step 524). Where the second trigger/metric has not been met (step 524, no) then the target on the user device (14*a*) is not updated (step 528), such as with the digital message. Depending upon the rule, the second metric/trigger may continue to be monitored or not. For example, if the digital message was to be sent only one time, then the rule is satisfied, and no additional monitoring is needed. Should an additional metric/trigger be defined by a rule that needs additional monitoring, the method (500) will be allowed to do so. Going back to step (524), if the determination is yes, the digital offer may be pushed (526), such as via the controller (at 514, 506) to those users who have scanned a tag (16*a*) and who meet the additional metric/trigger. Pushed content may update an element, such as a dynamic element, on a Web page, cause a popup to show on the user device (14*a*, 14*b*), send content to a digital wallet (24*a*, 24*b*), or any other way to push content as is known in the art.

Figure 2A:
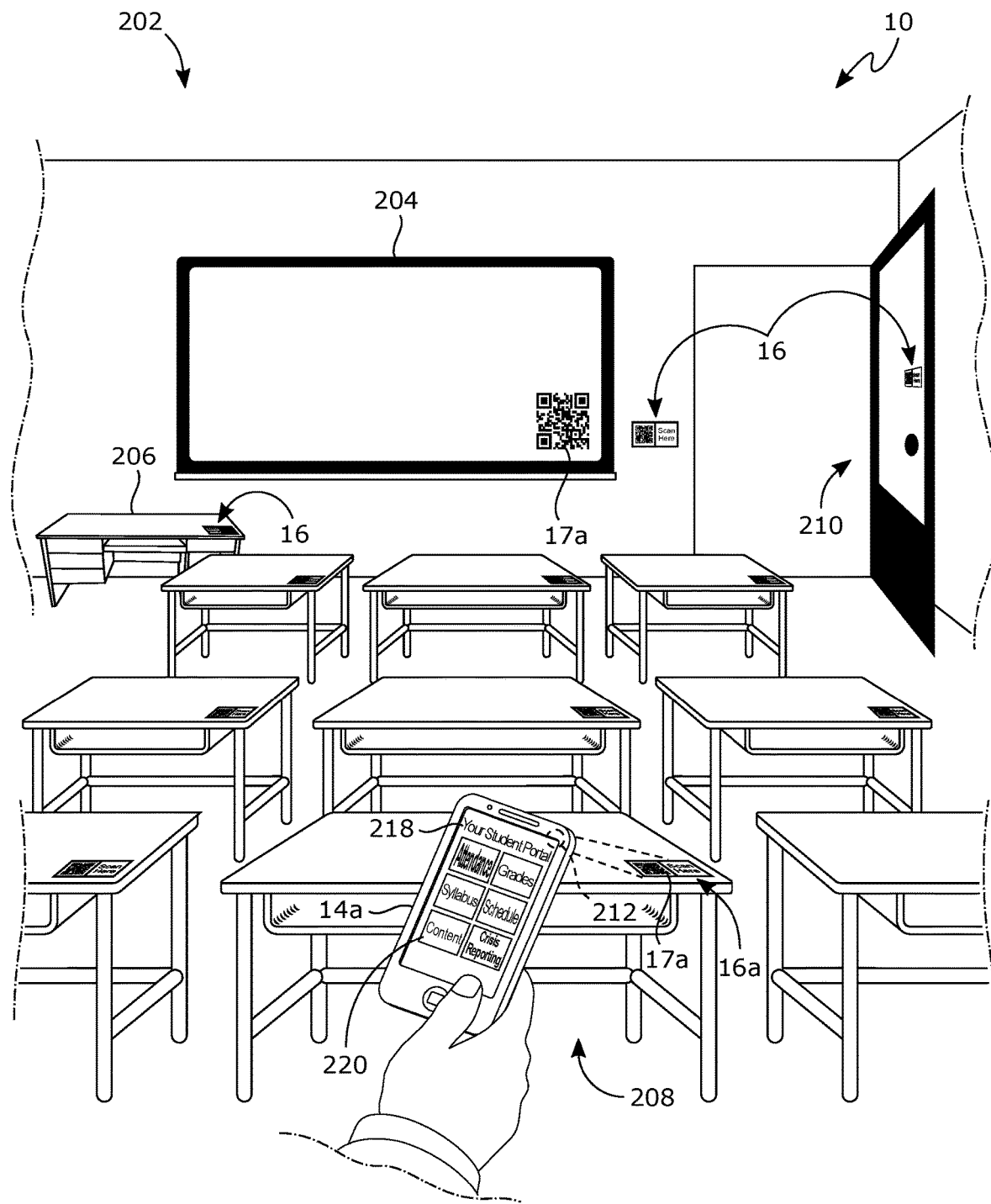
FIG. 2A depicts an exemplary classroom comprising a plurality of desks, a smartboard, and a mobile device that is accessing a user portal.

Local rules, as an example, may be associated with one or more targets being utilized for a given class or by a given educational institution. Referring to FIG. 2A as one example, each location on the campus (252-282) may represent a grouping of tags (16*a*). As such, when a MRC (17*a*) on a tag is scanned by a user at the art studios (258) the device (14*a*) may be redirected to first template of student portal (218), when a MRC (17*a*) on a tag is scanned by a user at the lab spaces (256), the user device (14*a*) may be redirected to a second template of a student portal (218), and when a MRC (17*a*) on a tag at the library (224) is scanned the user device (14*a*) it may be redirected to a third template for a student portal (218). Thus, all users may be redirected to a student portal (218), but each student portal (218) may be based on a different template. In this way, an educational institution may deliver customized content to users based on the template to which the user device (14*a*) was redirected. Local rules, other elements, or both may be written into each template to further customize content, which in some instances may be on an individualized level. That is elements of application code may be rules built into the system to provide the content delivery determined by the system, or can be applied at an earlier stage, e.g., at a tag ID group target information (step 422), which can provide a different original redirect URL/target than is received by or directed to, for another tag ID in a different group.

Referring back to FIG. 5, the interface server (306, at 510) may determine, or cause to be determined, if there are any rules associated with a given template (e.g. for student portal [218]) or another target. This is especially true where the rule may be designed as an educational institution-type rule where content may be pushed to a device (14*a*). In this case, however, the rule may only be provided in a given template (e.g., for users sitting in loge seats). A given template, however, may also have local rules written therein. Thus, per this illustration the local rule may desire to pull/acquire (at 508) information before, during, or after the template for the appropriate student portal is loaded on the user device (14*a*). To obtain this data, the database may be queried (at 512), via the interface server (at 510), using the unique ID to check data records for the requested information. As with the push example, if the database (at 512) does not store such information, the information is inconclusive, the local rule requires confirmation from an outside source, or other such situations, other data sources (at 512) may be consulted via the interface server (at 510). If the local rule is satisfied, then the appropriate target is sent to the template. If the local rule is not satisfied, then the template uses a "default" target or another, similar example. In an embodiment, data associated with the unique ID may be pre-analyzed to see if the local rule has been satisfied. Alternatively, data associated with the unique ID may be gathered (e.g., from a database, a third-party integration, or the like) and analyzed when the event user device (14*a*) makes the request. As yet another option, the data may be pre-analyzed and verified/checked for changes upon the user device (14*a*) request. The interface sever (306) may take all of the variables from the target application code, template, rules, and the like and send requests/queries to the appropriate data sources or links to the data sources (at 512). The data sources may include data from the database (308), blockchain (314), geofence (316), timestamp (318), third-party integrations (320) such as data servers/databases, analytics server (312), an administration server (310), and a counter (at 512), without limitation.

In some implementations, a counter may be needed. For example, a counter may be enabled to maintain the countdown. A counter may be software on platform (20) that may be used as a counting mechanism for rules or other reasons. As such, the counting mechanism may be configured to meet the counting requirements of a rule or other counting need. As an illustration, a counter may count the number of tags (16*a*) scanned at an educational institution during a particular time; count the number of tags (16*a*, 16*b*) scanned by a particular user device (14*a*, 14*b*) in a predetermined time window; count the number of times a user has interacted with the target delivered to that user device; or other such non-limiting illustrations.

Thus, while a target is displayed on a particular device (14*a*, 14*b*), dynamic content may be seamlessly and dynamically updated/changed per coding/interactions between the user device (14*a*, 14*b*) and the platform (20). Certain dynamic changes occur through push and pull techniques such as those detailed by FIG. 5. However, dynamic updates/changes may further take place through the use of various third-party application programming interfaces (APIs) and their respective functionality. At a high level, the interface server (306) may connect, or may cause the third-party integration server (320) to connect, to third-party hardware/software (e.g., server) via one or more third-party APIs/API calls to access the respective third-party integration/functionality as is known or will be known in the art. Thus, third-party integrations/functionality may push or pull information through analytics server (312), retrieve it from database (308) or another data store, or combinations thereof, for real time/live streaming, updating, changing, and the like as is called for by rules/instructions associated with the target of the tag ID. Furthermore, embodiments allow for the use of interactive, two-way communications between user devices (14*a*, 14*b*) and the platform (20) such as via the socket server (324) and/or a socket API, or the like as is known in the art. Certain communications then end, upon the end of the event or where the user closes the application, where the communication (at 504) is severed.

As is also indicated in FIG. 5 at (508), the platform (20) may collect a large amount of data via user devices (14*a*, 14*b*). For example, after scanning a tag (16*a*, 16*b*) the platform (20) may receive data from the user device (14*a*, 14*b*) such as date, time, and GPS or other location, the device orientation (i.e., landscape, portrait), type (e.g., iPhone, Android), IP and other addresses, and operating system as a few examples. Thus, methods such as methods (400, 500, or both) may be configured to collect and aggregate data. Additionally, tools such as cookies, widgets, plug-ins, and similar tools may also be used to obtain data from user devices (14*a*, 14*b*). This, and other, information may be stored in a data source (at 512) such as database (308) or other data storage and in association with the unique ID. Data acquired using the aforementioned tools and other tools/techniques may relate to user engagement with a target such as a student portal (218) as one non-limiting example. Such data may relate to digital offers presented to the user, digital offers downloaded by the user, products viewed by the user, purchases made by the user, to name a few examples. Such tools/techniques may also gather data relating to other user engagements such as total screen time, Internet browsing (times, sites/pages accessed, software used), updates to Web pages, other Web sites visited, the Internet, and the like. The user may also directly provide information via the user device (14*a*, 14*b*) such as by inputting personally identifiable information to obtain opportunities or offers such as unique information relating to user interests, user responses to questions, generic information about age or sex, or any other type of personally identifiable information. Such data is of high value to, for example, advertisers, proprietors, and the like, as it provides a large insight into consumer purchasing and Web browsing habits.

Data related to user devices (14*a*, 14*b*) may also be obtained from third party sources. As one example, when a query, request, or the like sent to a third party, the platform (20) may provide certain information with that query, request, etc., such as the unique ID, tag ID/target information, or combinations thereof. Thus, data returned by the third parties may also be stored (e.g., temporarily, or persistently) in association with unique IDs, tag IDs, target information, or combinations thereof. As one non-limiting example, service providers such as mobile/cellular providers may be queried to obtain information about user devices (14*a*, 14*b*). The unique ID identifying a particular user device may be sent to the service provider to obtain information about the particular device, or the service provider may provide information that may be later associated with a particular device. Either way, the platform (20) may collect and store information about users via the unique ID assigned to each user device (14*a*, 14*b*). As another non-limiting example, information associated with unique IDs assigned to user devices (14*a*, 14*b*) may be collected from various third-party integrations (320) such as in-educational institution metrics, integrated third-party metrics, and other tools, without limitation to the forgoing. Thus, third-parties, including third party metrics integrations (320) may enable collecting information about users, user devices (14*a*, 14*b*), or both from third parties including those who participate in a shared program or who sell or otherwise provide marketing information, demographics, and other data about the user.

In addition to collecting and storing data associated with unique ID, the platform (20) may analyze such data, which may or may not be recorded in association with unique IDs. Data analysis may occur while it is being collected, after it is collected and before it is stored, after storage, or combinations of the forgoing. Data, raw, analyzed, or both, may be stored in database (308) or another data store (at 512) such as blockchain (314), without limitation. The analytics server (312) may communicate with various aspects of the platform (20), to ensure data received from various sources is appropriately captured for decision making, analytics, and the like. That is, analytics server (312) may communicate with (either directly or via the interface server [306]), user devices (14*a*, 14*b*), third parties, third party integrations (320), time/timestamp (318), geofence (316), blockchain (314), database (308), even proprietor portal (322), or combinations thereof, so that data is captured as needed for desired analytics, decision making, and the like. For example, data may be subject to artificial intelligence analysis include machine learning/pattern recognition/deep learning as is now known or will be known in the art. Collected and/or analyzed data may be coupled with other information relating to the user/user device (14*a*, 14*b*), such as the unique ID associated with the user device (14*a*, 14*b*) for a variety of reasons, including content selection as one non-limiting example.

Content for display on user devices (14*a*, 14*b*) may be customized in numerous ways as has been detailed with respect to methods (400 and/or 500). Content may also be customized where data/data analysis shows that a user has, or group of users have particular preferences. These preferences may be utilized to modify content, such as advertisements that are delivered to that user/group of users. Furthermore, data analysis may allow the educational institution to generate rules specific to a user/group of users, send custom e-mails, push socket notifications or other messaging based upon the user's interactions/group of users' interactions with the platform (20), other such similar examples, or combinations thereof. Indeed, this provides for multiple opportunities for interaction and communication between the educational institution and the user to continue building relationships that can then be mined for longer-term relationships. As yet another implementation, the platform (20) may utilize unique IDs together with known information associated therewith to deliver unique advertising to users via third-party advertising services. For example, where available, the platform (20) has the ability to interface with advertising platforms to deliver a customized experience based on the user's search history or user information as a whole. Taking the forgoing together, it should be apparent that content provided to a particular user or group of users may be customized or modified as was described above with respect to FIGS. 4 and/or 5 and that data/information gathered as the user is engaged with the event target or the like, may be used to update/modify target content in real time, upon a subsequent scan of tag (16*a*, 16*b*) by the user device (14*a*, 14*b*), or both (e.g., at 508). For example, the socket connection (at 504) may be used to deliver pulled content, push content, notifications, and the like, and/or dynamically update content while the class or event is in progress.

Analytics may also determine which feature, elements, or the like provided by a target such as the student portal (218) a user or group of users interact with the most or spend the most time viewing. Thus, advertising on high-usage pages, features, elements, etc. may come at a higher cost. In other words, educational institutions may charge a premium to advertisers wishing to purchase the ability to place content, such as advertisements or digital offers on the pages or features of the student portal (218) or other target that receive the most traffic.

In the case of schools and the like, tags (16b) may be linked to particular students and distributed to students and parents alike. For example, the student's tag (16b)/MRC (17b) may be on the student's school-issued ID or student-related identifier, and the parent's tag (16b)/MRC (17b), which may be the same as or different from the student's MRC (17b), may be distributed to parents on a magnet, badge, card, or the like so that the student/parent can simply scan their respective tag/MRC (17b) (with respective user device [14b]) to access a target (e.g., a Web page) with information relating to the particular student such as grades, classes, upcoming activities, as a few non-limiting examples. In fact, with respect to graduation, concerts, sports events and the like, a secondary target may be accessed via a link in the "primary" target, although embodiments are not so limited. That is, parents, teachers (with their own tag/MRC (16b/17b) to connect to the desired target), other employees and the like may access targets (e.g., a Web page or the like) for events relating to the school in more than one way. One way may be via the tag/MRC (16b/17b) that may be used on a regular basis as described above, or via tags (16b) permanently or temporarily placed at the school gym, auditorium, or the like, which will enable access to the event-specific target/target content.

Educational Institutions (i.e., Venues) Defined

Educational institutions provide instruction to a variety of population groups, each having unique needs in terms of physical location, instruction, and content. In general, education starts with preschool loosely defined as children ages 0-6 years old. Preschool students likely do not have their own user devices and are not likely assigned a student ID; however, their parents/guardians, faculty, staff and administrators would have a user device and may be assigned an ID on behalf of their child. A physical location for preschool students typically consists of a building with one or more classrooms. The classrooms may or may not have multiple tables with chairs, and/or a faculty desk. Individual student desks may be located in the classroom however this is unlikely for this student population. The physical location may include one or more other spaces such as a common area, a cafeteria/lunchroom, offices, bathrooms, a gymnasium, and/or outdoor space. Preschool students generally stay with the same class for the entire day, said class being assigned to a primary classroom, although the class may move to multiple locations throughout the building during the course of the day. Preschool students may arrive at the building via a bus or parent/guardian arranged transportation.

Education continues with primary school loosely defined as children in grades kindergarten through eight however in many school districts, primary school typically ends somewhere after grade four and before grade seven. Primary school students may not have a user device when they first enter primary school but will likely obtain a user device during the course of primary school. Likewise, a primary school student may or may not be assigned a school ID, either digital or physical. A physical location for primary school students typically consists of a building with one or more classrooms, which may or may not be part of a larger campus. The classrooms may or may not have one or more tables with chairs, individual student desks and/or a faculty desk. The physical location may include one or more other spaces such as a common area, specialized classrooms (music room, art room, library, media center) a cafeteria/lunchroom, office, bathroom, gymnasium (with or without spectator seating), auditorium, and/or outdoor space. Primary school students generally remain in the same classroom space for the entire school day, although multiple faculty members may rotate in and out of the classroom and individual students or the class as a whole may move to other locations in the building throughout the day, for example, the class may go to the music room at an assigned time for musical instruction. Primary school students are typically transported to and from the building via a bus however transportation may also be parent arranged. Primary schools may offer extra-curricular activities.

Education progresses to middle school loosely defined as students in grades five through eight. These middle school students typically have one or more user devices and a student ID which may be in a digital or physical form. A physical location for middle school students typically consists of a building with one or more classrooms, which may or may not be part of a larger campus composed of multiple buildings. The classrooms typically contain individual student desks and/or a faculty desk, although specialized classrooms may contain a table and chairs, lab benches and the like as necessitated by the specialization. The physical location may include one or more other spaces such as a common area, specialized classrooms (music room, art room, library, media center, science labs, computer lab) a cafeteria/lunchroom, office, bathroom, gymnasium (with or without spectator seating), auditorium, outdoor space, and individual student lockers. Middle school students typically move to multiple classroom locations throughout the day as dictated by their schedule and may be giving time to stop at their lockers one or more times during the course of a day. Middle school students are typically transported to and from the building via a bus although parent/guardian transportation may be arranged. Middle schools typically offer a variety of extra-curricular activities.

Compulsory education in the United States concludes with high school defined as students in grades 9-12 and functions essentially the same as middle school with a greater emphasis on extra-curricular activities. Additionally, in high school, students look to continue their education by applying to colleges, universities, trade schools or other post-secondary institutions so there is a greater emphasis on recruitment, applications, and scholarships. High school students also typically start to enter to work force and look for employment or internship opportunities during the school year as well as during breaks.

Colleges and universities typically consist of multiple buildings located within one campus or across multiple campuses within a geographic region. They may contain residences for students, faculty, and staff, such as dorms, fraternity/sorority houses, apartments, or town houses. Buildings may be special purpose buildings such as classrooms, lecture halls, laboratory spaces, visual and performing arts studios, administrative offices, facilities buildings, theatres, gymnasiums, stadiums, libraries, cafeterias/restaurants, retail space, hospitals (in the case of a medical college), student centers, or any other type of building needed to accommodate the academic courses offered by the college or university. Buildings can also be mixed purpose and contain any combination of the aforementioned. The spaces within the buildings can be configured as needed for the purpose of the space. For example, a classroom may have desks or a table and chairs; a lecture hall may have stadium style seating with or without a tabletop like workspace; a laboratory may have a combination of lab benches, desks, and tables/chairs; a theatre will have seating, a dormitory will have beds, desks, chairs, and other items typically found in a dorm room. All buildings will have basic amenities common to any building such as a bathroom.

College and university students typically have one or more user devices and a student ID which may be in a digital or physical form. They typically move between multiple buildings on the campus as dictated by their academic, extra-curricular and social schedules. Some college and university students may continue their education at graduate school and therefore need access to recruitment, applications, scholarships, or other financial aid. Other college and university student will enter the work force and therefore need access to internships, mentors, and employers. Additionally, greater emphasis is put on social activities provided by the college or university such as sports games, performing arts, concerts and the like and therefore students need access to information related to these activities such as schedules and in-event information. Students living in on-campus housing, such as a dormitory, need to be able to report facilities issues within their living space such as inoperable lights, heating air conditioning and/or bathrooms. Given the typical campus setting, colleges and universities have unique needs in terms of security and incident reporting.

Boarding schools are similar in structure to that described above for colleges and universities except that the student population is in the compulsory grades ranging from first through twelfth and therefore the content delivered will be tailored to those populations. These students typically have one or more user devices and a student ID in physical or digital form.

Trade schools typically provide education to students ranging from grade seven to twelve or they can be post-compulsory providing education to a wide range of adults. Trade schools typically have highly specialized spaces within their buildings. For example, a beautician school may have chairs such as those found in a salon while an auto technician school might have bays and lifts such as those found in a dealership or garage and a culinary school may have kitchen spaces with stoves and prep space. The buildings may be standalone or part of a larger campus. Students typically have one or more user devices and a student ID in physical or digital form and typically look for internships, mentorship, or employment.

It should be understood that while the United States educational institution system has been described, the system and methods described herein can function in any educational institution setting, and while physical locations have been described, they system and method can function in both a physical and virtual education institution setting.

Stakeholders (i.e., Users) Defined

The system is designed to provide one point of entry for all stakeholders within the educational ecosystem such as faculty, students, parents, administrators, staff, coaches, and stakeholders external to the specific educational institution (i.e., if the system is being used by high school "A," universities recruiting from that high school are external stakeholders. Likewise external stakeholders can be business offering internships). Each of these stakeholders has different needs within the system and therefore will be given different rights and permissions within the system. One advantage of the system is it provides a single point of entry to the system for all stakeholders that delivers specific content and modules. Additionally, the system provides a single solution for the diverse needs of each of the educational institutions described above. For example, the needs of stakeholder in an elementary school vary from the needs of a stakeholders at a college or university and the system is able to provide the correct content and modules to each.

Faculty includes teachers, instructors, professors, adjuncts, teaching assistants, and the like. There are common tasks associated with all types of faculties including taking attendance of the students in each class; communicating grades and progress reports to students and potentially parents; and assigning homework, projects, papers, or other tasks to students. Faculty also needs to report incidents, non-limiting examples of which include a repair that needs to be made within the classroom (i.e., replace a lightbulb, fix a computer, clean up a spill), a fight between two students, a medical emergency, or a student that may be experiencing bullying or domestic violence.

Faculty needs the ability to interface with other systems and stakeholder in their respective educational ecosystem. For example, it would be advantageous for faculty to have access to students' academic schedules and to have a means for seamlessly and securely communicating with other faculty members, staff, and administration such as a student's guidance counselor. Faculty also needs the ability to deliver content to students that is related to or supplements their classroom instruction and to send announcements to students both during and outside of class.

Students can be any of the various types of students that attend the educational institutions discussed above. Students using the system need some of the same functionality as faculty such as the ability to report their attendance in a class, the ability to view grades and the ability to communicate seamlessly and securely with other stakeholders in the ecosystem. However, this functionality must be tailored for the individual needs of the educational institution. For example, in an elementary school setting as described above, as student may only need to record his or her attendance once a day since the student does not change classes, but in a high school setting, the student may be required to log his/or her attendance multiple times a day as the student switches class periods.

Additionally, students have other needs specific to their user type including the ability to view and change their class schedule; be assigned and submit homework and other assignments; order meals from the cafeteria or dining hall; order school merchandise such as uniforms, apparel, yearbooks, and/or physical or digital course materials; view digital yearbooks and purchase NFTs of same. Additionally, students need access to various forms of incident reporting. Student incident reporting may be verified for example, if a student uses the system to report a medical emergency. In this instance the system would need to know the student's identity and location to send the appropriate response team. In other instances, anonymous reporting may be desirable. For example, if a student wants to report that a fellow peer may require suicide intervention or if a student wants to report that they witnessed an incident of bullying, it is advantageous to report these incidences anonymously as to avoid retaliation, and thus encouraging the reporting of these serious issues. The system provides for both verified and anonymous incident reporting within the system.

Furthermore, for students, the system provides access to information and schedules for extra-curricular activities such as sports, band, drama, media and technology, student government or counsel, and the like. Extra-curricular activities extend beyond the school and the system provides the ability for students to search and apply for both seasonal and permanent jobs, internships, and volunteer opportunities. Depending upon the student's educational institution level, the system may provide the student user with the ability to search and apply for college, university, or trade school; assist with the recruiting process; provide information of financial aid and scholarships; allow the student to apply for financial aid and scholarships; schedule tutoring; applying for mentoring opportunities.

The system also provides for polling of students in a way that is verifiable. Polling can include voting for the prom king and prom queen or the destination of a school trip. However, polling can also be used in a crisis situation such as an active shooter. In this instance, the system can send a simple poll to students asking, "are you okay." The yes/no answer allows administrators to focus their attention on students who have responded no or who have not responded at all.

Parents includes biological parents, adoptive parents, grandparents, legal guardians, foster parents, or any other adult who is responsible for a student. Parent interaction with the system varies as the student navigates the educational institutions. For example, parents of preschool and elementary school students may use the system as a proxy for the student whereas parents of college and university students may have no interaction with the system or interaction may be limited to viewing sports or performance schedules. Parents share many of the same common tasks as faculty and students such as the ability to view grades, the student's individual schedule and the district calendar.

Parents are also able to use the system to communicate securely and seamlessly with faculty, and other stakeholders within the system as well as use the system for both anonymous and verified incident reporting. Parents may also use the system to access content delivered with respect to extra-curricular activities, employment opportunities, and college/university recruiting, applications, financial aid, and scholarships.

Administrators or Administration refers to a user at the educational institution who have a more superior level of decision making than faculty including, principals, superintendents, presidents, deans, provosts, headmaster/mistress, vice-principals, department heads/chairs, guidance counselors and the like. Administrators generally have unlimited access to the system with right and privileges to view and edit most modules. Administrators may receive and respond to incident reports, provide academic counseling and crisis counseling to students, faculty, and parents, and use the system to send system-wide communications to all users in the system for that particular educational institution.

Staff generally refers to all other employees of an educational institution that are not faculty or administration including, nurses, janitors, maintenance, IT, security, facilities managers, cafeteria/dining hall staff, secretaries/administrative assistants, and the like. Staff is able to access to incident reporting features of the system both to report incidents and respond to requests. Staff may be able to access features available to other stakeholders such as viewing a student's schedule or viewing the academic and events calendar for the educational institution, but staff may be limited in their ability to edit these functions. For instance, a security guard may have access to a student's schedule to determine that students assigned location at a particular time. Staff may also use the system to communicate seamlessly and securely with other stakeholders within the educational institution.

Educational institutions also interface with a variety of external stakeholders. For example, a high school typically has relationships with colleges, universities, trade schools, employers and military branches who recruit students. Likewise, colleges and universities have relationships with employers and industry who provide internships, mentorships, and employment opportunities to their students. The external stakeholders can use the system to post these opportunities, communicate seamlessly and securely with students, access student records once the correct permissions have been granted, post and receive applications, and offer financial aid and scholarship opportunities.

Athletics, visual and performing arts are a significant aspect of many educational institutions. These may function as their own sub ecosystem within an educational institution and the system provides modules specific to the needs of these users such as the ability to post schedules, deliver rosters and casts lists, and provide digital versions of things typically found at such events like a digital program.

Location of MRCs Defined

A high-level overview of an exemplary system (10) is shown in FIG. 1. The system (10) may include one or more administrator devices (12), an interactive educational platform (20), a user device (14a) associated with an on-campus user, a user device (14b) associated with a remote user, and one or more networks (18). The system (10) may also include a plurality of machine-readable codes ("MRC") (17a, 17b) associated with a respective tag (16a, 16b). As implied in FIG. 1, a certain number of tags (16a) may be present in the buildings or on the campus of the educational institution, "on-campus tag" (16a) and additionally one or more tags may be remote from the buildings or campus of the educational institution, "remote tag" (16b).

FIG. 2A shows an exemplary classroom interior (202) of an educational institution which includes a portion of system (10) shown in FIG. 1. In this case, the classroom interior (202) is a typical instructional classroom including an interactive display (204), a faculty desk (206), one or more student desks (208), an entrance way (210) that allows users to pass between the classroom interior (202) and the hallway or exterior of the building. Presumably, the entrance way (210) has a door, not shown, but this feature is optional. The interactive display (204) can be any commercially available devices such as a smartboard, a smart white board, LED display or smart TV. The classroom interior (202) contains a plurality of tags (16a) with each tag containing its own uniquely coded MRC (17a). One or more of the tags can be a master tag (16) as described in further detail throughout the specification. The MRC (17a) can be read, scanned, detected, or otherwise decoded (collectively, "scanned") by an appropriately enabled (e.g., camera, QR scanner, and/or NFC reader [212]) user device (14a).

While the classroom interior (202) is depicted as a traditional instructional space with individual student desk, it should be understood that other configurations can exists based upon the needs of the educational institution. For example, the student desks can be replaced by one or more tables with chairs, lab benches, beautician stations, art easels, machines, or any other configuration necessary for student learning to occur. The classroom interior (202) may also include none or multiple faculty desks or the faculty desk may be a different type of workstation better suited for instructing students such as a podium or demonstration space. Likewise, the classroom interior (202) can have none or multiple interactive displays and more than one entrance way. It should also be understood that the classroom interior (202) could take the form of a lecture hall with stadium style seating, a computer lab, a scientific lab and engineering lab, or it could be a non-traditional space such as a shop for auto mechanics, machining, or carpentry; a room of dentist chairs for instruction to hygienists students; a room of stoves for culinary instruction; and the like.

Figure 2B:
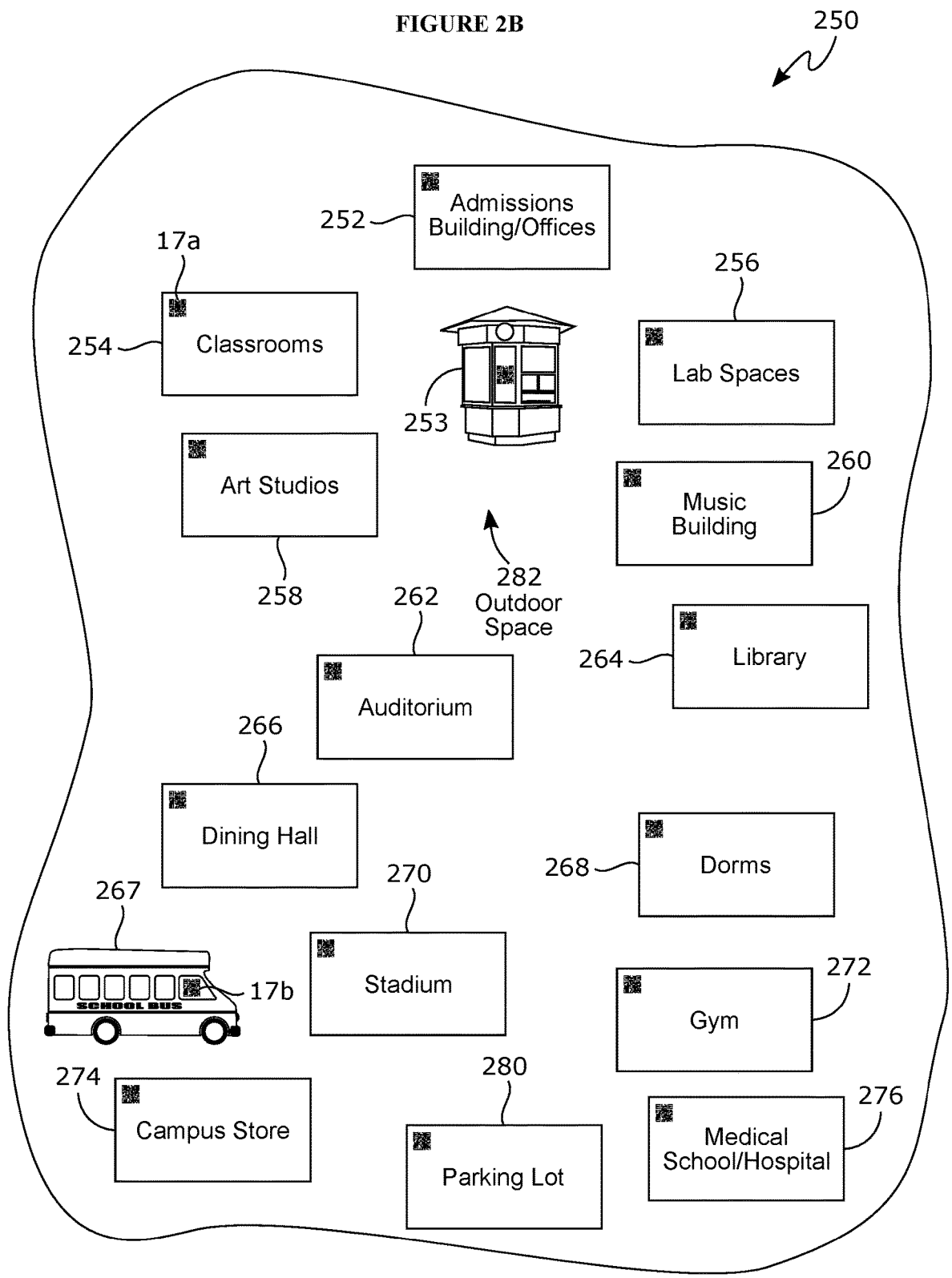
FIG. 2B depicts an exemplary campus of an educational institution.

FIG. 2B shows and exemplary campus (250) of an educational institution which includes a portion of system (10) shown in FIG. 1. The campus (250) consists at least one building, structure or space but can include as many buildings as necessary to meet the needs of the educational institution. FIG. 2B shows one potential combination of buildings, structures and spaces including administrative building(s) (252), classrooms (254), laboratory space(s) (256), art studios (258), music building(s) (260), auditorium(s) (262), library(s) (264), dining hall(s) (266), dorms (268), stadium(s) (270), gym(s) (272), campus store(s) (274), medial school/hospital(s) (276), outdoor space(s) (282), a parking lot(s)/garage(s) (280), emergency kiosk(s) (253) and school bus(es) (267). Each of these buildings may contain one or more spaces described in FIG. 2A. In the case of a kiosk (253) or a bus (267) these can be mounted with one or more tags (16a, 16b) containing a unique MRC (17a, 17b). The educational institution may have one campus or many campuses spread throughout a city, state, region, country, continent or across multiple cities, states, regions, countries, or continents. Each building on the campus (250) contains a plurality of on-campus tags (16a) and optionally one or more master tags (16).

Figure 2C:
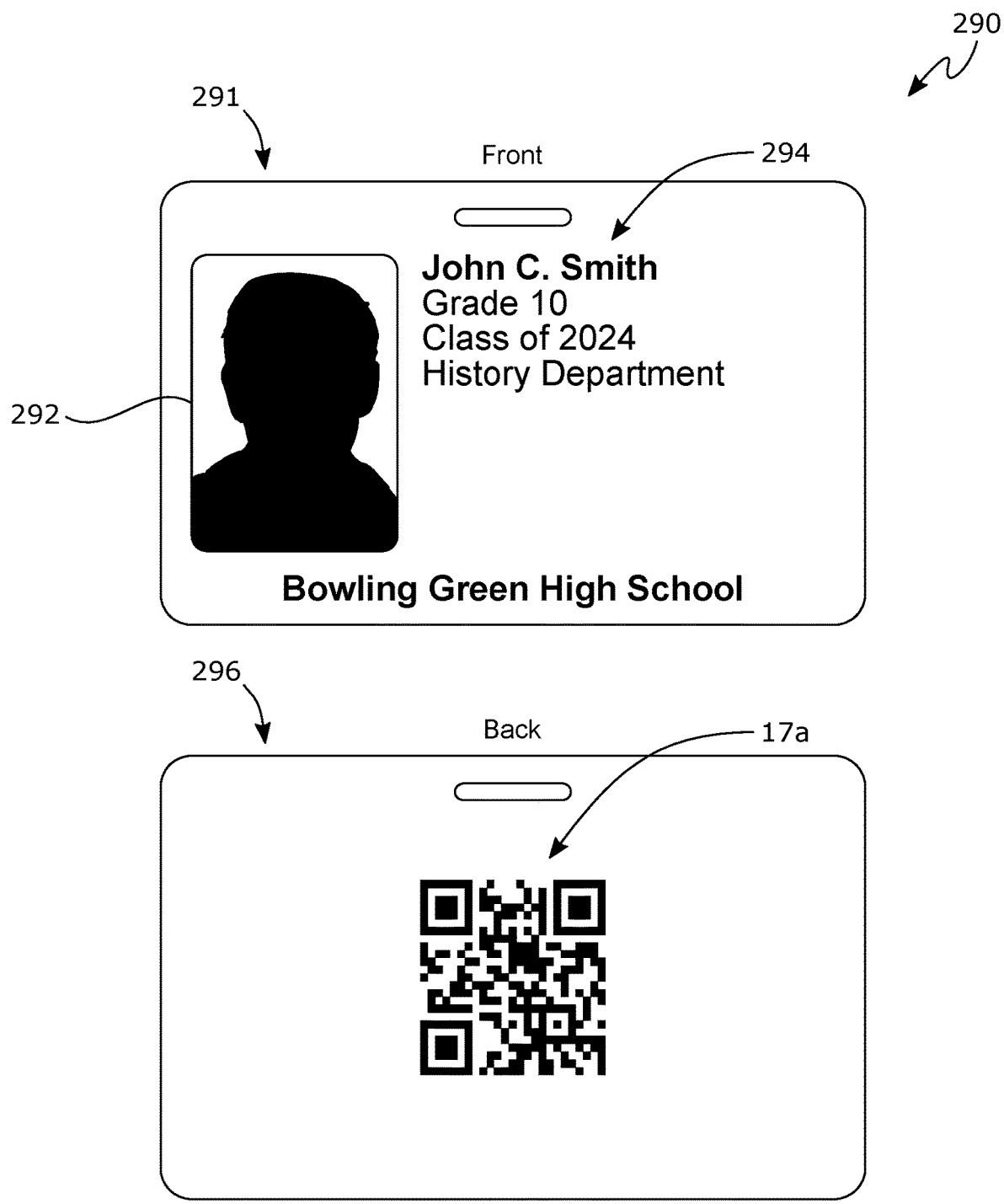
FIG. 2C depicts a student identification card.

FIG. 2C is a non-limiting example of a physical student ID (290). The front (291) may contain graphics and images such as a photograph of the student (292), unique identifying information (294) about the student (i.e., name, grade, year of graduation, department), and the like. The back (296) of the physical student ID (290) contains an MRC (17a).

One advantage of the system (10) is that each MRC (17a, 17b) is uniquely coded with a unique tag ID and tag URL. The tag IDs are stored in a database (308) and when a tag is installed at a particular location, that location is stored in the resource record for the tag ID. The location stored in the resource record can be general (i.e., GW Elementary School, XYZ University) or it can be very precise. Returning to FIG. 2A, one example of the level of detail that could be stored in the resource record could be the tag (16a) affixed to student desk (208) number 3, row number 1 in classroom number 605, at GW Elementary School on the Southwest campus. The resource record stores additional information about the tag location that can be used to create tag groupings. For example, the resource record for classroom interior (202) might indicate the room is used only for seventh grade so the tag would fall into a tag grouping for all seventh graders. Likewise, the unique tag ID assigned to the MRC (17a) on the tag (16a) affixed to the faculty desk (206) would indicate the faculty status on the resource record for that tag ID and therefore, that tag ID might require a second level of authentication before entering the system (10). This tag ID might be included in a separate or additional tag grouping from the tag (16a) affixed to the student desk (208). Additionally, the interactive display (204) can be used to display an MRC (17a), that can be scanned by multiple users. These MRCs are dynamic in nature, meaning that they can be modified on the display to generate different MRC, and may be used by the system (10) to deliver supplemental or special content. The classroom interior (202) may include one or more master tags (16) that allows a user with sufficient privileges to simultaneously update all of the tags associated with the master tag (16). The master tag may be located within the classroom interior (202) such as near the entrance way (210) or external to the classroom interior (202) such as in the hallway in close proximity to the entrance way (210).

Returning to the exemplary campus depicted in FIG. 2A, the system's (10) use of tag placement, tag IDs and resource records provides an elegant solution for delivering content, and alerts and receiving requests in a way that can be organized to include the campus as a whole, a specific building on a campus, or an exact desk within the building. Each building can have one or more master tags (16). A master tag (16) can be located at the entrance of the building so that it can control all tags (16a) within the building, master tags (16) can be located at a common entry point to a floor of the building, such as near an elevator bank, to control all tags (16a) on a floor, master tags (16) can be located outside of a particular room of the building to control all tags (16a) within the room, or any other configuration decided by the educational institution.

It should be assumed that each space within a building serves a particular purpose and tag placement can be configured as dictated by the use of the space. For example, an auditorium or stadium with seats, may have a tag (16a) on each seat that is uniquely coded to the seat's exact location so that the system (10) can be used to deliver content relevant to the event occurring in the space. A cafeteria or dining hall (266) may have a tag (16a) at each place where a student might be seated when consuming a meal. A parking lot/garage (280) may have a tag (16a) at the entrance and at every parking space. While non-limiting examples have been provided, it should be understood that configuration of the tags within a space of a building can be done in any manner that best suits the educational institution.

Additionally, tags can be mounted in movable objects that come and go from the building or campus. For example, elementary schools, middle schools, and high schools frequently transport students to and from a campus or building on a bus. Tags can be mounted on the movable object, for example, a tag (16a), a master tag (16) or both can be mounted at the entrance to the bus or just inside of the entrance, or tags (16a) can be mounted on each seat within the bus.

Another advantage of the system is that certain tags (16a) or MRCs (17a) may require additional levels of authentication in order to display content. For example, the placement of an MRC (17a) on a physical student ID (290) is uniquely coded to that student's records. When the MRC (17a) is scanned, the system (10) delivers content related to that student. For example, the system (10) may display a portal where the student can view his grades (as discussed in greater detail throughout the application). It is not desirable for this information to be made available to any device that scans this particular MRC (17a) on the physical student ID (290). Therefore, the system (10) has the ability to code the unique tag ID to require an additional level of authentication in order for sensitive content to be displayed. For example, the unique tag ID can launch a series of rules in order to access the sensitive content. Depending upon whether the rules are met, different content is displayed. Additional authentication may require an administrator to associate the unique ID on the user device with the unique tag ID. Therefore, only the user device (14a) containing the correct unique ID will be delivered the full content. If another user device (14b) scans the tag, that device will be redirected to general content as determined by the educational institution.

On and Off Campus Use

Not only does the system (10) provide for use by a user at the educational institution's physical location, it can also be used by a variety of remote stakeholders at any location. For example, if the student ID (290) is not at the educational institution's physical location and the MRC (17a) is scanned by a remote user device (14a), the browser on the user device will still be pointed to the redirect/identification server (302) which communicates with the controller to determine which rules are in place. For example, the system (10) may check the geolocation of the user device to determine if the target sent to the remote user device (14a) will be full content or content restricted to a remote user.

Likewise, parents can be issued an ID similar to the student ID (290) and a parent can use this ID to access the system (10) remotely with their registered user device (14b). Or a parent can access the system by scanning their child's student ID (290). Faculty, staff, and administrators may also be issued IDs from the educational institution which can be used to access the system.

In remote learning scenarios, the platform used to conduct the remote class, whether it be standard video conferencing software or a purpose-built educational platform, can contain an MRC in the video feed or the MRC can be displayed anywhere on the course Web site or educational institution's Web site. Likewise, faculty, staff and administrators can access the system by scanning an MRC displayed on the course Web site or the educational institution's Web site.

The educational institution may also grant access to remote external stakeholders, such as recruiters, by providing those stakeholders with a unique MRC via e-mail, text messaging, SMS, MMS, push notification or socket notification. The educational institution can uniquely code this MRC to each recipient. This would allow the external stakeholder user to access the system by scanning the MRC (17b) with a remote user device (14a), and the browser on the user device will still be pointed to the redirect/identification server (302) which communicates with the controller to determine which rules are in place. Based upon the rules, the appropriate template will be delivered to the external stakeholder.

Templates Defined

The system (10) can deliver a variety of targets. One type of target is a template in the form of HTML, Web app or progressive Web app. Each educational institution determines how many templates are needed for their unique needs. Alternatively, an educational institution may elect not to use a template and rely solely on a redirect URL but in most instances, an educational institution will elect to use one or more templates. The system (10) is capable of storing and implementing as many templates as needed by an educational institution. For example, there can be one template for the entire school system, there can be different templates for each grade level, there can be a different template for each faculty member, or there can be a different template for each individual class taught by a faculty member. Likewise, each extra-curricular activity can have its own template, or each event held at the educational institution (i.e., sports game, theatre production, graduation) can have its own template.

A template can be created by anyone with administrative privileges in the system (10) as designated by the educational institution. For example, the educational institution can allow each faculty or staff member to create a template, or the educational institution can designate a dedicated faculty or staff member to create templates for the entire educational institution. Likewise, separate templates can be created for on-campus and remote users. Each template will be assigned a unique template ID and stored in the system.

Getting to the Correct Template in Response to Scanning MRC

As previously discussed, unique tag ID's can be grouped into tag groupings. For example, all of the tag IDs associated with the tags (16a) in classroom interior (202) may be included in one tag grouping. Likewise, all of the unique MRCs (17a) on student ID (290) may be grouped based upon the demographic information of the student. For example, all of the MRCs (17a) on student IDs (290) belonging to high school juniors may be in one tag grouping. It is possible for a tag ID to be assigned to more than one tag grouping.

Returning to FIG. 2A, a tag (16a) may simultaneously belong to the tag grouping for classroom number 605 in the West building, which includes just the tag IDs for the tags (16a) located in the classroom interior (202); the tag grouping for the West Building which includes unique tag IDs for every tag (16a) located in the West Building; and the tag grouping for all homeroom classrooms which includes the unique tag ID for all tags in spaces designated as a homeroom classroom across the entire educational institution.

Returning to FIG. 2C, the unique tag code associated with an MRC (17a) on a student ID (290) may simultaneously belong to multiple tag grouping such as all students who are juniors, all students that drive to school, all students in the drama club. When a user device (14a or 14b) scans a tag (16a or 16b), the system (10) looks up the tag ID as shown in FIG. 4 at 412. The system (10) checks to see if the tag ID is grouped at (422) and if so, the system (10) obtains the tag ID group target information, in this instance, the correct template for the tag grouping.

Tag groupings can be further dependent on the element of time. Educational institutions typically follow a schedule, for example, during first period, room 605 in the West building is occupied by Mrs. Smith's English class while during second period, the same room is occupied by Mr. Brown's math class. Therefore, when checking a tag grouping, the system also checks the element of time to see if additional rules have been applied to the tag grouping.

The educational institution predetermines the template assigned to each tag grouping at a particular time. For example, when a student scans a tag (16a) in the classroom interior (202) of classroom number 605 in the West building during first period, the system delivers the correct template which could be a specific template for Mrs. Smith's first period English class, a template for all English classes, or a generic template for the educational institution. However, if the same tag (16a) is scanned during second period, the template specific to Mr. Brown's math class is delivered. In an alternative embodiment, because the student's class schedule is known, and the start and end time of each class period is known, once a student scans a tag to enter the system in the morning, the system (10) can automatically deliver the correct template for each period throughout the day without a need for the student to scan a tag in each room. Likewise, rather than scanning a tag (16a) within a classroom interior (202), the student can scan the MRC on the student ID (290) and the system will determine the correct template based upon tag grouping and time. Anyone with administrative privileges can override the tag groupings and deliver a template or redirect URL at any time as deemed appropriate by the educational institution.

Device/Student ID Verification

Because the system (10) allows users to access sensitive information such as grades, health records, college applications and crisis counseling by scanning the MRC (17a or 17b) on a personal ID such as a student ID (290), faculty, staff or parent ID, the system (10) has a second level of authentication to confirm that the user device (14a or 14b) that scans the MRC (17a or 17b) is authorized to view that information. In a non-limiting example, this is accomplished by having a user register his user device (14a or 14b) at the time the student ID (290) is issued under the guidance of a system administrator. When the student ID (290) is issued, the administrator asks the student to scan the MRC (17a) on the student ID (290) with his user device (14a) for the first time. The system's redirect/identification server (302) checks the user device (14a) for a manifest with a unique ID (22b). The system (10) associates the unique ID (22b) with the resource record for the unique tag ID associated with the MRC (17a) on the student ID (290). The tag ID is then added to the tag ID grouping for all tags permitted to accesses sensitive information. One of the rules included in the system may be, if tag ID is included in tag grouping for sensitive information, then check to see if unique ID (22b) on user device (14a) is associated with tag ID for MRC (17a). If all of the parameters set by the rule are true, then the system (10) allows the user device (14a) to access sensitive information. If the rule is not met, then the system (10) redirects the user device to the default target established by the school district (i.e., the school's homepage). It is possible to associate more than one unique ID (22b) with the same tag ID as an authorized user device (14a or 14b). For example, at the direction of an administrator, a parent may associate his or her user device (14a or 14b) with one or more student IDs (209). This would allow parents to access sensitive information by scanning the MRC (17a) on his or her child's student ID (209).

Alternatively, if a user device (14a) was not previously registered with a student ID (209), the system (10) provides alternative means of verifying that the user device (14a) is permitted to access sensitive information. Here, the MRC (17a) on the student ID (209) still belongs to the tag grouping for all tags permitted to access sensitive information. When the MRC (17a) is scanned by the user device (14a), the system checks for the rules associated with the tag grouping. If the user device (14a) is not able to meet the parameters to pass the rule, then the system (10) redirects the browser on the user device (14a) to a Web page where the user can authenticate his identity by providing unique identifying information. For example, the student may be asked to provide his first and last name, date of birth, home address, social security number, and/or parents' names or any other information not already printed on the front (291) of the student ID (290). The educational institution will designate the number of unique identifying information questions that must be confirmed in order satisfy the rule. The system (10) will check external data sources to confirm the unique identifying information supplied by the user matches the unique identifying information in the verified data source. For example, the system may check the educational institution's student records and if the social security number and date of birth entered by the user match those in the educational institution's records for that student, then the user has satisfied the rule and is permitted to access sensitive information.

Third Party Integrations

The system (10) has the option to integrate with one or more third parties via API calls. For example, the system (10) may connect with the educational institution's attendance software, grading software, scheduling software, external content sources such as instructional videos or other materials, data feeds, and the like, as determined by the educational institution to best meet its needs.

Dynamic Features/Elements

The system (10) has the ability to deliver specific content and digital offers to individual users based upon a trigger. The trigger is realized by monitoring both internal and external data sources. For example, the educational institution may want to reward all students who have received three of more "As" at the end of a semester or marking period with a digital offer for a free ice cream. Via an API call, the system is able to query an external grading database and determine which students have met the threshold to receive the digital offer. Here, the rule would be to achieve three or more "A's" and the trigger is receiving the marking period receiving the three or more "A's." In another non-limiting example, the system may be used to influence behavioral changes in a student. For example, a student who is routinely late to class may be incentivized to change this behavior by delivering a digital offer when the student is on time to ten consecutive classes (i.e., the trigger). Thus, the trigger would be upon the student meeting the $10^{th}$ consecutive on-time arrival to classes, wherein upon the occurrence of the trigger the system would deliver the digital offer.

FEATURES OF THE INVENTION

Embodiment #1: Attendance

Taking attendance is a common practice at educational institutions, for example, taking attendance of the students in a particular class, or taking attendance of faculty and staff who have reported to work. In many cases, the burden of taking classroom attendance falls on the faculty member and hybrid classrooms (a mix of in-person and virtual learning) present unique problems. If students are able to self-report their attendance by logging into a software solution, those solutions lack the ability to verify the student's presence at the time attendance is logged.

As shown in FIG. 2A, the system (10) provides for a plurality of desks (208) in the classroom interior (202). Each desk contains a tag (16a), each with a unique MRC (17a) which is assigned a unique tag ID. The tag IDs may belong to one or more tag ID groupings. In this instance the tag IDs are grouped for this particular classroom interior (202), for example, the West building, classroom number 605. The system (10) also has one or more master tags (16) located throughout the classroom interior (202). If the classroom interior (202) has an optional faculty desk (206), a master tag (16) will be affixed to the faculty desk (206). The master tag (16) is capable of controlling all of the tags assigned to it. In this example, the master tag (16) affixed to the faculty desk (206) can control all of the tags (16a) within the exemplary classroom number 605 in the West building. Educational institutions can configure tag groups and assign master tags in any configuration best suited for their needs.

At the beginning of the scheduled instructional period for which attendance should be taken as determined by the educational institution (i.e., the start of the school day or the start of a period during the day), the faculty member scans the master tag (16) with her user device (14a). The system (10) determines if the user device (14a) is authorized to control the master tag (16), as described in depth elsewhere in this application. If the user device (14a) is not authorized to control the master tag (16), the user device (14a) will redirect to a default target via a redirect URL. If the system (10) determines that the user device (14a) is authorized to control the master tag (16), then the system (10) directs the user device (14a) to the correct target, in this instance the target is a Web app that displays a GUI with several options on the user device (14a). From the GUI, the faculty selects "take attendance."

At this point the Web app may ask the faculty to set a time parameter (i.e., rule) during which other user devices can scan a tag to log their attendance or the educational institution can predetermine time parameter rules for the entire educational institution. One non-limiting example of the time parameters could be from the start of the class period through the end of minute five, record the unique ID associated with a user device that scans a tag as present and on time; from minute six through the end of minute ten, record the unique ID associated with a user device that scans a tag as present but late; after minute ten, record the unique ID associated with a user device that scans a tag as physically present but not credited with attendance. In certain embodiments, the act of taking attendance within the class session, provides a temporary lock on the user device. In such a lock situation, the user device would be enabled to receive content and information from the teacher, such as the student could be engaged within a display on their user device or displayed on an interactive display (204). The lock can automatically be removed once the user device scans out of the classroom, or when the school period ends, as non-limiting examples.

Alternatively, the system can close the attendance feature after a certain length of time and consequently, if a user device scans a tag after the expiration of this time period, the system delivers a redirect URL that points the browser on the user device to a different target. Once student users have scanned the tag and successfully logged their attendance in class, the system (10) sends them the appropriate redirect URL as determined by the faculty member or educational institution. The tag (16a) scanned by the student user device is now also under the control of the master tag (16) and can be utilized by the faculty member to deliver content relevant to the class, or, the system (10) can disable certain features from the users devices under the control of the master tag for example, disable gaming or messaging software during the specified time period that class is occurring.

In another non-limiting example of this embodiment, an educational institution can instruct the system (10) to automatically launch the attendance module. Typically, educational institutions adhere to some type of schedule. In a high school, there may be several class periods scheduled with specific start and end times during the course of the day with time allotted in between periods for students move from one location to another. Because the schedule is known and remains generally static, the system (10) can be preprogrammed by the educational institution to automatically launch the attendance module for all tags at the scheduled start time for each period without the involvement of faculty. Likewise, the time parameters can be preset by the educational institution. This would allow the student to mark attendance by simply scanning a tag and making attendance on their user device. This can be done once a day or at least class period. Attendance can be time limited, such that only marking attendance during the defined time slot is recorded as present for attendance purposes.

In the event that every desk (208) does not have a tag, or there is no designated seating area, the interactive display (48), can project or display an MRC (17a) for a specified amount of time that can be scanned by all user devices (14a) within the range of the interactive display (48). Because the MRC (17a) has been assigned a unique tag ID, the MRC (17a) can become its own tag grouping tied to a specific location within the educational institution (i.e., the West building, classroom 605) and thus, when the attendance module is initiated, any user device (14a) that scans the MRC (17a) will be logged in the system (10) for purposes of attendance as described above.

The system (10) has the option to require a second level of authentication in order for a student's attendance to be counted as present. For example, after scanning the tag (16a) with her user device (14a), the system (10) can direct the user to scan her student ID (290) before she is counted as present for attendance purposes. In other instances where identity verification is paramount, the system may direct the student to use the camera on her user device (14a) to take a photo and via image recognition, that image is compared with the image from the student ID (290) to confirm the student's identity or the system can access other biometrics on the user device such as a fingerprint reader.

Educational institutions frequently utilize a means of transportation, such as a bus, to bring students to and from the educational institution. Being able to take attendance of the students as they enter and exit the bus provides an accurate and real time account of all students on a particular bus at a given moment in time. This is advantageous if the bus experiences an emergency, such as an accident, as easily accessible digital records show an accounting of each user device and the associated unique ID and record that scanned the tag (16b). While this non-limiting example uses a bus as the mode of transportation, it should be understood that the system (10) works with any mode of transportation used by an educational institution.

In this example, a tag (16b) is placed on a surface in close proximity to the entrance of the bus, i.e., the outside body of the bus next to the door before the student enters, on the bus door in such a way that it is accessible when the door opens, directly inside the front of the bus on a dashboard or other location near the drive. For this variation of recording attendance, the time parameter rules are removed so any time a new student enters the bus, she scans the tag (16b) with her user device (14b) to record her presence on the bus. Because the unique ID for the user device (14b) is associated with that user's student record, the system is able to log each student's presence on the bus. Likewise, when the student exits the bus, she has the option to scan the tag (16b) a second time to indicate that she has left the bus. Once this occurs, the attendance count is updated to indicate this user device is no longer on the bus. The system can collect additional data from the user device (14b) at the time is scans the tag (16b) such as time of scan and geolocation of device at time of scan. This information can be stored on the user record for each student and recalled in the event that the educational institution needs to know a particular student's location when she entered and exited the bus.

With the rise of hybrid education, students may attend classes offered by an educational institution fully remotely or a combination of in person instruction and remote instruction. Additionally, a single class may consist of some students physically located within the classroom interior (202) and other students in a remote location such as the student's house or dorm. The faculty member is able to use the system (10) to record the attendance from both an on-campus user device (14a) and a remote user device (14b). In this example, the attendance module is either launched by the faculty member or preprogrammed to launch by the educational institution as described above. However, for remote users, the remote MRC (17b) can be incorporated into her student ID (290), or the remote MRC (17b) can be displayed in the live video feed of the instructional period. The student uses her remote user device (14b) to scan the MRC (17b) and the system records her attendance as described in detail above.

The system (10) has the option to check to see if a remote user device (14b) is permitted to attend classes remotely. For example, a particular educational institution may require students to elect and be approved for remote instruction. This designation would be stored in the user/device record for the unique ID associated with the remote user device (14b). If approval is required, when the remote user device (14b) scans the MRC (17b), the rules launched by the system (10) as part of the attendance module include, is this tag ID on campus or remote, and if remote, is the remote user device (14b) authorized for remote instruction. If the user device is authorized for remote instruction, attendance is logged. If the remote user device (14b) is not authorized, the system (10) sends a redirect URL which points the browser on the user device to a target as determined by the educational institution. The system also has the option to utilize geofencing if the student is required to be in a certain remote location in order to be counted present for attendance purposes or geolocation is the educational institution desires to know the student's location during the instructional period.

FIG. 6 is a flow chart of one method for taking attendance (600). Starting at (602), the tags are grouped in any configuration that meets the needs of the educational institution. When the defined class period starts at (604), a master tag is scanned by a faculty member (606) via the faculty member's user device. The system determines if the user device that scanned the master tag is authorized to do so (608). If the user device is not authorized to access a master tag, the system redirects the user device to the educational institution's default URL or target (624). However, if at (608) the system determines that the user device is authorized to scan the master tag, a Web app, such as a template, is launched on the user device (610). From the GUI of the Web app, the faculty member selects take attendance (612) after which, the faculty member sets the time parameters for counting a student, on time, late or absent (614). Next, students scan the appropriate tags with his/her user devices (616). The responses are recorded (618) and the appropriate records and databases updated (620). The attendance module closes at the appropriate time as determined by the faculty member (622). If a user device scans the tag after the time parameter for attendance has ended (626) depending on if there is a faculty rule in place (630), for example, send all students in this class period under the control of the master tag to the specific template for this faculty member's class, the user device will either be redirected to the educational institution default URL or target at (624) or the URL will be redirected to a URL or target determined by the master tag (628). This allows for specific content from the given class period to be displayed. This teacher can utilize a template, for example to prepare content to be viewed by the students.

Because of the unique ID, the system will, on a backend database, known the expected location of a student at a given time, because the students have a schedule and should be in class during a given time. Accordingly, when content is pushed to a student on the user device, it is not necessary to re-scan a tag, because the system knows what template to push to the student in order to provide the appropriate content to the user device. This feature will allow for administrators or faculty to pre-populate information into a template to be utilized within the appropriate teaching period. Thus, in math, the teacher may have pre-loaded certain formula for calculating the area of a shape, while in English, the template may populate certain passages for discussion, while in art history, certain images may be populated to discuss for identification and style, as non-limiting examples. This allows the faculty to prepare classroom visuals within the system, allowing for students, wherever located to see the same content.

Embodiment #2: Crisis Reporting is Both Anonymous and Verified

Students at every level of educational institution face unique challenges that need to be reported faculty, staff, or administration. Often times, students are reluctant to report delicate matters for fear of stigmatization or retaliation. For example, incidents of bullying, substance abuse, mental health crisis, eating disorders, sexual assault, domestic violence and/or suicide concerns may not be properly reported because the student (or even faculty or staff) with knowledge of the incident may not trust that they can report their concerns anonymously.

While as described above, the system provides a system and method for knowing the unique ID associated with a user device (14a or 14b), it also provides an option for permitting the user to access the system anonymously if enabled by the educational institution. In this embodiment, rather than checking, the unique ID (22b) at step 410 from FIG. 4, when the user device (14a or 14b) scans the tag (16a or 16b), the system (10) checks to see if the tag ID is grouped to allow anonymous crisis reporting. If the tag ID is not grouped, the user device (14a or 14b) is redirected to the default URL established by the educational institution or the next set of rules which in turn delivers the appropriate redirect URL. However, if the tag ID is grouped, then the system (10) delivers a redirect URL that launches a target on the browser of the user device. The browser displays a GUI in which the user can either select from a list of prepopulated selections or the user can report the crisis in free form text. The text of the crisis report is sent to the redirect/identification server (302). The redirect/identification server (302) parses the text for any flagged words. The system may have default flagged words, but each educational institution has the option to add its own words to the word bank. For example, words like "bomb" or "gun" are flagged words. If the redirect/identification server (302) detects a flagged word, or a flagged prepopulated selection, it accesses the unique ID (22a or 22b) on the user device (14a or 14b) and the system (10) reports the unique ID and the text of the crisis report to a system administrator. However, if the redirect/identification server (302) does not detect any flagged words or a prepopulated selection, then the redirect/identification server (302) does not access the unique ID (22a or 22b) and the crisis report is sent to the appropriate faculty, staff, or administrator at the educational institution. Alternatively, the system can capture the unique ID earlier in the process and associate it with the text of the crisis report before the text is parsed for flagged words but not transmit the unique ID with the crisis report if no flagged words are identified. In this alternate process, the unique ID is only sent to an administrator if the text of the crisis report is deemed to be a safety concern.

FIG. 7 is a flow chart of one method for anonymous crisis reporting (700). Starting at (702) the user device scans a tag (702) at which time the redirect/identification server checks to see if the tag belongs to the tag group to allow anonymous reporting (704). If the tag is not authorized, the user device is redirected to the educational institution's default URL or target (718). However, if the tag is authorized, a redirect URL to the crisis reporting target is delivered to the user device at (706). Next, the user enters the crisis to be reported (708) and the text of the report is sent to the redirect/identification server (710) where it is parsed for flagged words (712). If a flagged word is identified, the redirect/identification server access the unique ID on the user device (720) and both the crisis report and the unique ID are sent to an administrator (722). Returning to (712), if no flagged words are identified, the redirect/identification server does not access the unique ID stored on the user device at (714) and the anonymous crisis report is sent to the appropriate faculty, staff, or administrator (716).

This duality of anonymous and verified access to the system can be used in other ways. For example, an education institution may utilize the functionality to allow students, faculty and/or staff to submit anonymous suggestions to the educational institution. Again, flagged words can be instituted so that the system can identify a user whose suggestion violates the educational institution's policies. Step (712) may use flagged words, codes, natural language processing, or other now known or developed methodologies to identify language, which allows the system to determine whether the report can be made anonymously or that should include the unique ID.

The system is so designed to encourage reporting of certain incidents to the administrators or to other individual to assist with an issue. By anonymously reporting, students are more likely to report the issue. This allows for administrators and other safety personnel to assist a student in need or to otherwise ensure a safe learning environment. However, some issues may require non-anonymous reporting so that administrators or safety individuals can more directly assist with the immediate issue or to address another grave health or safety issue with a given student, wherein knowing the name of the reporting person is important.

Safety Module

Returning to the system's (10) ability to send unique messages to individual user devices, the system can deliver a variety of safety modules. In times of unanticipated natural disasters, or unauthorized intruders in an educational institution's building, it is critical to be able to account for every student, faculty staff and administrator and to know that user's physical state. Because of the system's ability to send messages via text message, SMS, MMS, push notification or socket notification to a user device, in the event of an emergency, the system can message each user device that logged into the system, for example, every user device that was counted as present at the beginning of the day via the attendance module.

In a non-limiting example, an educational institution experiences an emergency such as a tornado, earthquake, or active shooter. A system administrator, who can be located at the educational institution or remote from the educational institution, is able to send a notification to each user device (14a or 14b). The message may simply ask, "are you okay?" and provide two options to reply "yes" or "no." The system tracks and tallies the unique IDs that have responded "yes," the unique IDs that have responded "no" and the unique IDs who were counted as present for attendance purposes but who have not responded to the message. The allows the educational institution and outside first responders to focus efforts on the users who are missing or may require assistance.

The system also provides a safety module that promotes responsible decision making amongst users, particularly college and university students. Tags (16a) are mounted at various locations throughout the campus and may be mounted at or near the entrance to a fraternity or sorority house. Users have the option to scan the tag as they enter the house. Fraternity and sorority houses traditionally hold parties and other events on certain nights or times of the year. These events may be scheduled with the college or university and there may exist as an event record in a database that the system can access, or they may be ad hoc such as a party on a Friday or Saturday night. Knowing that such events typically provide alcoholic beverages, the system can be programed to send a notification to each user device that scanned the tag at the fraternity or sorority house at the time of a known event or night ad hoc events are traditionally held. The notifications can be schedules to repeat as many times as deemed appropriate by the educational institution for example, 11:00 PM, 12:00 AM, 1:00 AM, and 2:00 AM. The alert can be a text message, SMS, MMS, push notification, socket notification or phone call. Again, the message can simply be "are you okay?" or the message can be more specific such as "do you need a ride?" or "do you need security assistance in returning to your dorm?" Based upon the response and the rules associated with that response, the system may cause another action to occur. For example, the system might schedule a ride share via a third-party API integration or the system might alert campus security to send personnel to assist the user in returning to his or her dorm room.

Additionally, each tag ID can be programmed to have an emergency default override redirect URL. This redirect URL launches a Web page on the browser of the user device that has the option to call for help. The emergency redirect URL can be launched by any number of rules. For example, if a building is scheduled to be closed from 8:00 pm-6:00 am, if a tag is scanned during those hours, the default redirect URL can be the emergency redirect URL. Additionally, colleges and universities may set a rule that all tag groupings for outdoor spaces and common areas change the default redirect URL to the emergency redirect URL between the hours of 9:00 pm and 7:00 am knowing that it is more useful for a user device to quickly contact security during these times then to access the college/university homepage.

Rules can also be established so that if a tag is scanned a certain number of times in succession by the same user device, for example three times in a row, five times in 60 seconds, N times in N seconds, the emergency redirect URL is sent to the device. In this example, the tag could also be the MRC on the student ID (209), which provides a way for a user who might not know his or her location and may not be able to use the device to call 911 (i.e., the user is intoxicated, is unsure of his or her location, and is experiencing assault) to utilize the system to discretely contact emergency services. The emergency redirect URL launches a Web page on the browser of the user device which allows the user to contact emergency services via the system. The system is able to review and process the request and escalate the request to the appropriate faculty, staff and/or administrators at the educational institution or contact external emergency personnel. In connection with sending the emergency redirect URL, the system is able to determine the geolocation of the user device or the exact location of the tag that was scanned which enables responders to locate the user even if the user does not know his or her exact location. Furthermore, the device can enable or utilize geolocation to allow for the precise location of the user device to allow for emergency services to identify the location of the user device.

Interfacing with External Stakeholders

As previously mentioned, the ecosystem of an educational institution includes external stakeholders. For example, colleges and universities and military branches recruit from high school students and need a way to deliver relevant content to students and parents. Conversely, students need a way apply to colleges and universities, scholarships, and financial aid. Employers recruit students from high school, college and university for short term employment, internships, and career opportunities. Community thought and business leaders seek to offer mentorship opportunities to students. Nonprofits post volunteer opportunities for students to strengthen their resumes.

The system (10) provides for a novel way for external stakeholders to deliver specific content to an individual's user device. As described above, an educational institution has the ability to generate a unique MRC (17b) which the system delivers to the external stakeholder via e-mail, text messaging, SMS/MMS, push notification or socket notification. The external stakeholder scans the MRC (17b) with his user device (14). The MRC (17b) is included in a tag grouping which gives the user device rights and permission to do certain things within the system (10) as designated by the educational institution. For example, the remote user may be permitted to create templates or schedule content to be delivered to particular tag groupings or unique ID groupings. Thus, a college recruiter can deliver an advertisement to a particular grouping for example, all juniors, or only juniors with a certain GPA. The content delivered to each user device can be the same or personalized content can be delivered to each user device. Likewise, the system (10) can be used to deliver admission applications and scholarship opportunities which can be completed within the system or outside of the system.

In another nonlimiting example, employers can post or have the educational institution post job opportunities. The employer can designate certain qualifications necessary for a student to apply for the opportunity such as only engineering majors, graduating in spring semester with a GPA over 3.5. When a student scans the MRC (17b) on his or her student ID (290), and selects view job openings, the system (10) checks to see if the MRC is in a tag grouping and based upon the rules of the tag grouping, determines which job openings to show this particular student. Therefore, this particular job posting will only be seen by students who meet the criteria.

Tutoring and Counseling

The system (10) provides for the ability for students to schedule things like tutoring and crisis counseling by scanning the unique MRC (17a) on his or her student ID (290). The tutoring and counseling services can be provided by the educational institution via chat, video conferencing and the like, or the services can be provided via an external API call to a third-party provider.

Incident Reporting

The system (10) provides for various forms of incident reporting. Incident reporting options can be available only to particular tag groupings. For example, a master tag scanned by a user device with the correctly enabled permissions may be able to report a student behavioral issue. In this example, a faculty member scans the master tag (16) with her user device (14a). The system (10) checks for the unique ID (22a) on the user device and confirms that the unique ID is in a grouping permitted to access master tags. The faculty user is then able to use the system to report a behavioral incident such as a fight between two students. Alternatively, the faculty member can scan her faculty ID to access the system and the system will check to see if the MRC (17a) on the faculty ID is in a grouping permitted to report behavioral incidents.

Once an incident is reported, the system (10) can deliver content to that user device related to standard protocol for addressing the situation. For example, the system may deliver a checklist of things that must be done in the case of a fight between two students that results in an injury (i.e., record student's names, record the names of witnesses, record visible injuries, etc.)

Additionally, incident reporting can be made available to any user device that scans a tag. For example, users can report a malfunctioning toilet in a bathroom, a light bulb that needs to be changed, a printer that is out of ink, a computer that needs service, and the like.

Delivery of Content

Tag groupings allow for faculty members to deliver unique content to their classes via a master tag. For example, during an instructional period, the faculty member can deliver a video to all student user devices in the classroom interior, or the video can be delivered to just some user devices, or a different unique video can be delivered to each user device. Content can also be delivered in the form of a poll for example, vote for the prom king and queen. Because the user device, contains a unique ID, the system is able to ensure that it receives only one vote per unique ID. Additionally, educational institutions can sell advertising space within the system which is delivered to user devices as determined by the tag groupings. For example, all sophomores and juniors might receive an advertisement for SAT prep courseware while seniors might receive an advertisement for graduation paraphernalia.

Knowing a Student's Exact Location

Figure 8B:
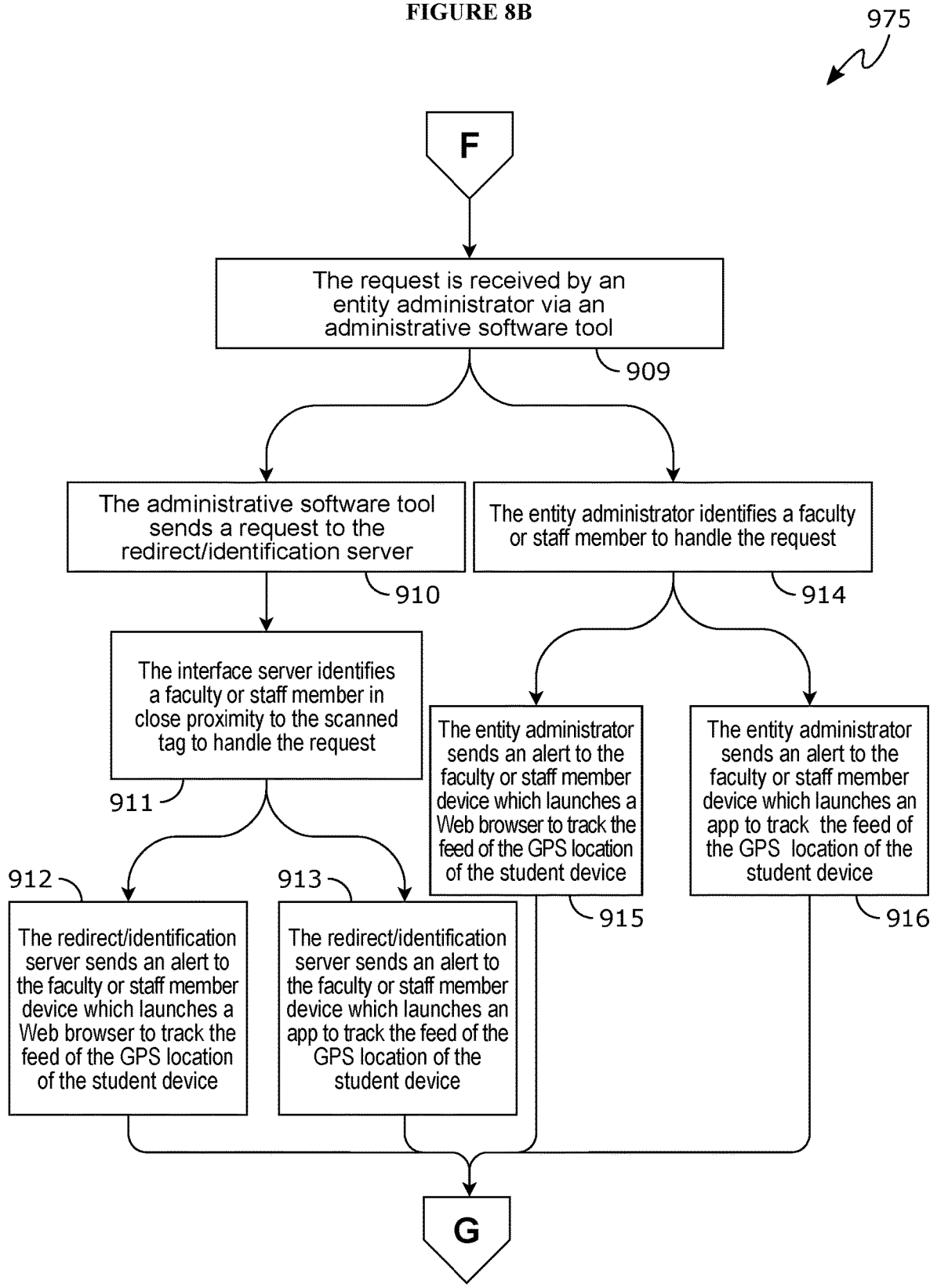
Figure 8C:
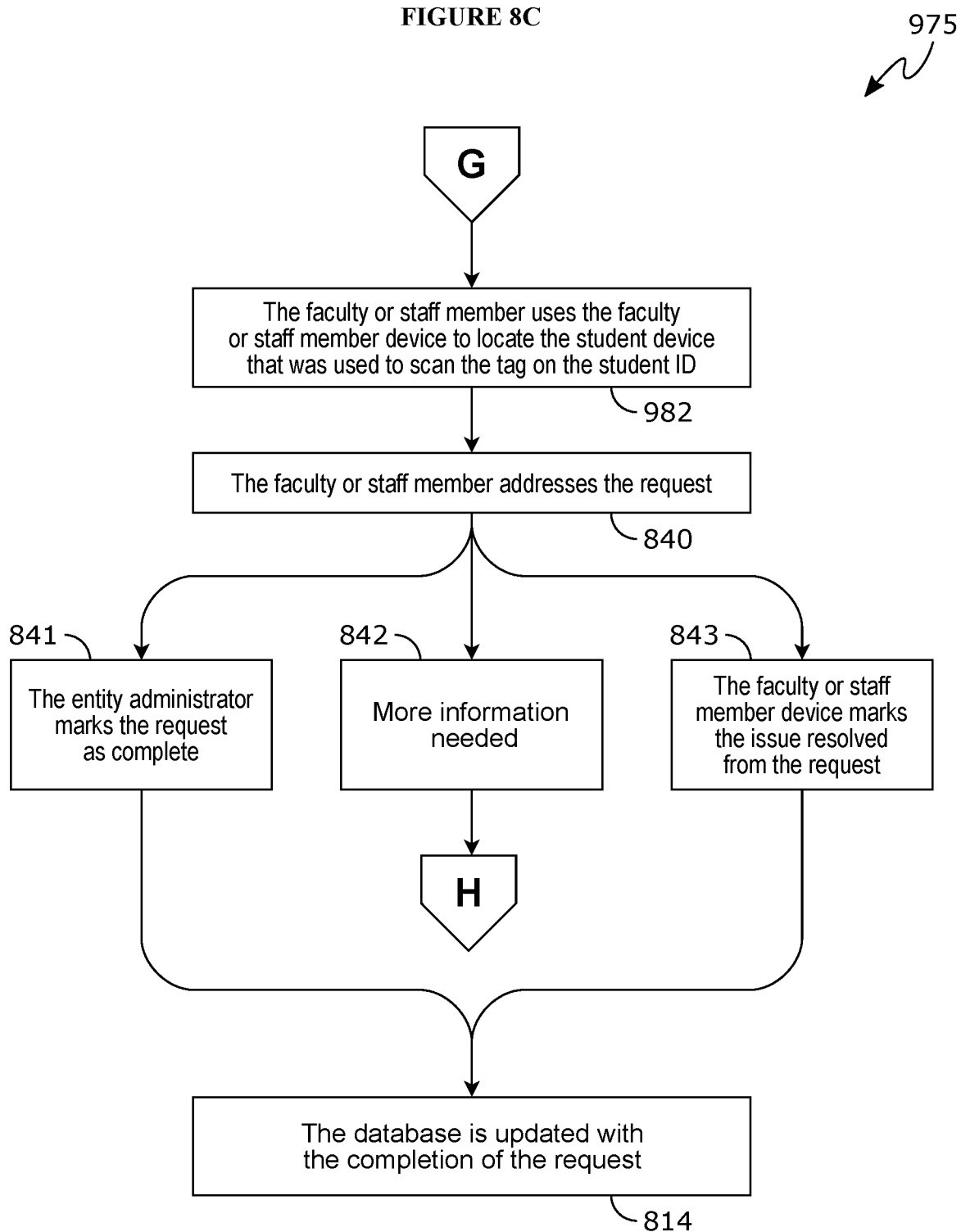

In a further example, as detailed in FIGS. 8A-8C, the user device itself becomes the beacon for location purposes. Accordingly, the system (975) details wherein a tag is mounted to a student ID (976) or similar mobile aspect, such as a badge, or movable object which is typically carried or worn by a user (977). The user scans the tag on the student ID with the student's user device (978). It is preferable that the user device is GPS-enabled. For example, the student is having a health issue and scans the tag to report the issue. Upon scanning, a Web browser (902), URL, GUI, or an app (905) is opened, with the user authorizing the device to access the student user device's location (903) or the app settings are accessed, and permission is granted to access the student's user device's location (906). In some cases, the app has preauthorized the access to location, or the educational institution may require that the system be granted access to the student's user device's GPS location. Upon receipt, the server creates a request based on the tag scan (979). The student user device, having authorized the location, acts as a beacon, sending GPS or other positioning location coordinates to a server (980). The server associates the continuous or variable feed of GPS location coordinates to the request (981). The request is received by an entity administrator via an administrative software tool (909), wherein the administrator identifies a faculty or staff member to handle the request (914), or the administrative software sends a request to the data sever/verification database (910), wherein the data server/verification database identifies a faculty or staff member in close proximity to the scanned tag to handle the request (911).

Several options occur where the data server/verification database sends an alert to the faculty or staff member device via SMS, MMS, push notification, or e-mail which launches a Web browser, URL or GUI to track the feed of the GPS location of the student's user device (912) together with the details of the request. Alternatively, this can be performed in an app (913) that is launched on an employee device. Similarly, the entity administrator can manually send an alert to the employee device via SMS, MMS, push notification, socket notification, or e-mail to open a Web browser, URL or GUI to track the feed of the GPS location of the first device (915) or the faculty or staff member can track the student's user device via an app to track the feed of the GPS (916). The faculty or staff member is now in possession of the location of the student's user device that was used to scan the tag mounted to the student ID and of a second device in the faculty or staff member's possession which is capable of tracking the location so as to direct the faculty or staff member to that location (982). Once the faculty or staff member successfully locates the student's user device that scanned the tag mounted to the student ID, the faculty or staff member addresses the request (840) and the request either is resolved by an administrator (841), the faculty or staff member device marks the issues as resolved from the request (843) or more information is needed (842). Where more information is needed (842), a return (via H) to step (979) is necessary to restart the process. Otherwise, upon completion, the database is updated with the completion of the request (814).

In a nonlimiting illustration, an educational institution utilizes system (975) to be able to locate students during times of personal and institutional wide emergencies and also to be able to locate a student in the event that the student is not in his/her assigned classroom at a specified time. Each student is given a student ID with a tag (976). The student ID is typically carried or worn by the student (977), but not so required.

Amy, a student, is experiencing a medical emergency in an area of the campus where others are not readily present, so she uses her user device to scan the tag on her student ID (978). Once the tag is scanned by the student user device (978), there are two possible scenarios: the tag scan will open a Web browser, URL, or GUI on the student user device (902), or the tag scan will launch an app on the student user device (905).

OPTION ONE: The tag scan opens a Web browser, URL, or GUI on the student device (902). In this option, when Amy uses her smart phone to scan the tag, her smart phone opens a Web browser (902) which asks Amy if she wants to share the location of her device. Amy clicks the icon authorizing the first device to access the device's location (903). The Web browser is now able to collect data from the device such as the device's physical location including latitude and longitude, altitude, the time of the scan, weather conditions in the area and any other information that mobile devices and the like are able to capture and share. The Web browser is also able to continually access the device's location at any given moment in time.

OPTION TWO: The tag launches an app on the student's user device (905). The app could also be executable code. Once the app is launched on the device, Amy clicks the icon authorizing the app to access the device's location and other data (906). Alternatively, Amy could access the app's settings and grant the app permission to access the device's location and data for this single use or in all instances. The app is now able to collect data from the device such as the device's physical location including latitude and longitude, altitude, the time of the scan, weather conditions in the area and any other information that mobile devices and the like are able to capture and share. The app is also able to continually access the device's location at any given moment in time.

Regardless of whether the user device scanning the tag launches the Web browser (902) or the app (905), once location sharing is enabled and data is collected, the user makes a request via the Web browser or the app. In this illustration, Amy indicates that she is having a medical emergency and request assistance from a medical professional. The server creates a request based upon Amy's tag scan (979). Without knowing the GPS location of Amy's user device, it would take more time to locate her and if Amy were to leave the location after she scanned the tag, the responder would not be able to locate her. Since Amy has authorized the system to access the location of her device, Amy's smart phone now acts like a beacon sending a feed, either continuous or noncontinuous of Amy's GPS location to the server (980) regardless of where Amy moves from her original location.

The server associates this GPS location coordinates feed from the user device to the request (981). The request is received by an entity administrator via an administrative software tool (909). Returning to step (909), when the request is received, if the administrative software is utilizing AI and machine learning without human involvement, the request is sent to the data server/verification database (910) where it is analyzed to determine the location of the request, the urgency of the request and the faculty or staff member skills needed to resolve the request. In this example, the server knows that the request is a medical emergency and assigns it a higher priority and identifies that employees with medical training are necessary to resolve the request. The data server/verification database then locates the faculty or staff member in the closest proximity to the current location of the continuous GPS feed from the user device that was used to scan the tag affixed to the student ID (911). The system is able to use the geolocation of the faculty or staff member's device to determine which faculty or staff member is closest to the request.

Once the appropriate faculty or staff member is identified, the system has two options. Option One: The redirect/identification server can send an alert to the faculty or staff member device, without human involvement, which contains a link to the request and to launch a Web browser to track the continuous feed of the GPS location of the first device (912). When the faculty or staff member clicks on the link, it opens a Web browser, URL, or GUI that contains the requests. Additionally, the link contains the exact location of the student device that scanned the tag on the student ID at any given moment in time and when the faculty or staff member clicks on the link, it takes him to a GPS interface which transmits a graphical representation of the student user device as a moving beacon overlayed on a map of the campus. The GPS interface could also be a preexisting map or directions app preinstalled on the faculty or staff member's phone or it could be part of the system (975) which provides direction to current location of the student user device acting as a beacon via a Web browser, URL, or GUI launched by and controlled by the system.

In this example, the system sends a text message to Security Guard Sam's smart phone indicating Amy is having a medical emergency and is in of need of assistance. When Sam clicks on the link it opens a Web browser on which the system continuously transmits Amy's location within the campus to Security Guard Sam's user device.

Option Two: The data verification server/verification database sends an alert to the faculty or staff member device, without human involvement which launches a system (975) app to track the continuous feed to the GPS location of the student user device that was used to scan the tag affixed to the student ID (913).

Returning to step (909), when the request is received, if the administrative software is being operated by a human administrator, the administrator will review the request to determine the skill set needed to respond. Via the administrative software tool, the administrator will then use the geolocation of the faculty or staff members' devices to determine which faculty or staff member with the appropriate skill set is closest in proximity to the request (979). Again, the administrator has identified that Security Guard Sam is closest in proximity to the current location of the continuous GPS feed of the student user device that was used to scan the tag on the student ID in step (978).

Once the appropriate faculty or staff member is identified, the system has two options. Option One: The administrator can send an alert to the faculty or staff member device which contains a link to the request and to launch a Web browser to track the continuous feed of the GPS location of the first device (915) that scanned the tag on the student ID at any given moment in time. When the faculty or staff member clicks on the link, it takes him to a GPS interface which transmits a graphical representation of the student user device as a moving beacon overlayed on a map of the campus. The GPS interface could also be a preexisting map or directions app preinstalled on the faculty or staff member's phone or it could be part of the system (975) which provides direction to the via a Web browser, URL, or GUI launched by and controlled by the system. Option Two: The redirect/identification server sends an alert to the faculty or staff member device which launches a system (975) app to track the continuous feed to the GPS location of the student user device that was used to scan the tag affixed to the student ID (916).

Regardless of how the notification is sent to the faculty or staff member (912, 913, 915, or 916), the faculty or staff member uses the faculty or staff member's user device to locate the student user device that was used to scan the tag on the student ID (982). In this instance, Security Guard Sam has opened a Web browser on his smart phone. The Web browser contains a detailed map of the campus. On the map, Amy's device is represented by a blue dot and Sam's device is represented by a red dot. As Amy moves throughout the campus, her dot moves. Sam can continue to track Amy's movements on his device until he is able to locate her.

In another embodiment, the Web browser, containing a detailed map of the campus, is used by the administrator. On the map, Amy's location is indicated by a blue dot and Security Guard Sam's location is represented by a red dot. The administrator monitors the location and proximity of the two devices and using a form of one-way or two-way communication, such as a phone call, radio, or text message, the administrator guides Sam to Amy's location.

Once the faculty or staff member reaches the student user device used to scan the tag on the student ID, the faculty or staff member addresses the request (840). In this example, when Security Guard Sam reaches Amy, he is able to attend to Amy's medical needs. Since Sam was able to resolve the request, he has two options. Option One: The faculty or staff member device marks the issue resolved from the request (843). In this example, Sam can either use his device to scan the tag on Amy's student ID and mark the request resolved (843), or Sam can access the request record received on his faculty or staff member device in steps (912) or (915) without scanning the tag or otherwise logging into the system and marks the issue resolved (843).

Alternatively, the administrator can resolve the request by marking it complete (841). This can be done by the employee contacting the administrator via SMS, MMS, text message, e-mail, phone call, or two-way radio communication to report that the request has been resolved and the administrator marking the request as resolved in the system (841), or the administrator can inspect to confirm that the request has been completed and then mark the request as resolved in the system (841).

If Security Guard Sam is unable to resolve the request, for example, Sam needs to call for an ambulance to transport Amy to the hospital, Sam can use his faculty or staff member device to create a new request in the system requesting additional information or assistance (842). Creating the request for additional information can be accomplished by using the faculty or staff member device to scan the tag on the student ID, accessing the request record received on the faculty or staff member device in steps (912) or (915) without scanning the tag or otherwise logging into the system, or by communicating with the administrative software or administrator via two-way communication such as radio or phone.

In another non-limiting example, the ability to track a student's user device location allows the student to verify if a student was in a particular area when an incident occurs. For example, if vandalization occurs in a location at the educational institution or if a fight breaks out amongst students, the system's ability to know the location of a student's user device will assist in determining if a particular student may have been in the location at the time of the incident.

Accessing Video Via Scanned Tag

In a further embodiment, tags with MRCs are placed throughout a college campus. For example, a tag is placed in common area of dorm building. That common area contains security cameras. If there is an incident in the common area which is reported to campus security, when the security guard responds to the incident, he can scan the MRC in the common area with his user device. The identification/redirect server recognizes that the user device has certain system permissions, such as an administrator permission. The identification/redirect server also recognizes the exact location of the placement of the tag from which the MRC was scanned via a tag look-up more fully described starting at (428 from FIG. 4). The identification/redirect server directs the interface server via the process described in FIG. 5 to allow the security guard user to access video replay from the security camera located in the common area from which the MRC was scanned.

Referring back to FIG. 3, the infrastructure detailed therein is exemplary, dividing processing between at least two servers (e.g., redirect/identification server [302] and interface server [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Computer (12), user devices (14a, 14b), and servers (e.g., 302, 306, 310, 312, 320, 322, and 324) may each be a general-purpose computer. Thus, each computer includes the appropriate hardware, firmware, and software to enable the computer to function as intended and as needed to implement features detailed herein. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one non-limiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14a, 14b) and other data sources to provide their intended functionality as is known in the art.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:

1. A system for reporting a health or safety issue comprising:
   a. a server system comprising a computer processor, a database, and at least one server; at least one tag; and at least one unique user device having a unique ID; and
   b. wherein in response to the user device scanning the tag, the server system performs the following method:
      i. receiving a request from the user device at a server, said server detecting whether the at least one tag is grouped to allow an anonymous report;
      ii. if yes, delivering a redirect URL to the user device;
      iii. reporting a health or safety issue to the server;
      iv. parsing, from reporting the health or safety issue, information and determining presence or absence of a flagged word or phrase;
      v. upon the presence of the flagged word or phrase, appending the unique ID to the report; and
      vi. reporting the health or safety issue to an appropriate administrator.

2. The system of claim 1 wherein upon the absence of the flagged word or phrase, no unique ID is appended to the report.

3. The system of claim 1 wherein the system comprises a graphical user interface (GUI), wherein the GUI identifies one or more issues which are populated in said GUI as an executable button; upon an executable button being pressed, determining if the report is flagged for anonymous or nonanonymous reporting; and reporting the health or safety issue.

4. The system of claim 1 wherein the tag comprises a machine-readable code (MRC) and wherein the tag is located on a student ID, wherein the system associates the unique ID located on the user device with a resource record for a unique tag ID associated with the MRC on the student ID.

5. The system of claim 1 wherein a geolocation of the user device is provided.

6. The system of claim 1 wherein the system generates an automatic reminder on said user device at a predetermined time.

7. The system of claim 1 wherein upon reporting of a health or safety issue, the report is provided to emergency services.

8. The system of claim 1 wherein the report is provided to the administrator.

9. A method of taking attendance within an educational setting comprising:
   a. scanning, via a user device, a first tag located on a student ID, said user device having a copy of a unique ID and said first tag comprising a tag ID;
   b. determining a time of the scanning;
   c. determining, from a database, a schedule corresponding to the unique ID;
   d. marking, within the database, the unique ID as being present at a given time for a given tag ID; and e. associating a resource record for the tag ID with an MRC on the student ID.

10. The method of claim 9 wherein the scanning via a user device locks the user device.

11. The method of claim 9 wherein the scanning via a user device further directs the user device to a template.

12. The method of claim 11 wherein the template is defined by the time and the unique ID.

13. The method of claim 9 further comprising a second tag, said second tag being a master tag, wherein scanning of the second tag opens a window for the scanning of the first tag by the user device.

14. The method of claim 9 wherein attendance is counted when the first tag is scanned a first time for marking the user device present and scanned a second time to mark the user device as absent.

15. The method of claim 9 wherein after scanning by the user device and detecting a change according to the schedule, pushing a template corresponding to the change to the user device.

16. A method for pushing content within a template in an educational setting comprising:
   a. scanning, via a first user device, a first tag, said first user device having a first unique ID and said first tag being a master tag and comprising a first tag ID;
   b. scanning, via a second user device, a second tag, said second user device having a second unique ID, and said second tag having a second tag ID and being controlled by said master tag;
   c. defining a template being loaded onto said second user device upon the scanning of the second tag; and
   d. wherein the template comprises content corresponding to said second tag ID, said second unique ID, and a time corresponding to the scanning of said second tag.

17. The method of claim 16 further comprising pushing the content to said second user device within the template.

18. The method of claim 16 wherein scanning via the first user device creates a database entry defining the start of a class period and opening a time period wherein the scanning of a second tag by a second user device marks the second unique ID as present at the time of the scanning by the second user device.

19. The method of claim 16 wherein the scanning of the second tag by the second user device locks the second user device.

20. The method of claim 16 wherein the second user device rescans the second tag and the rescanning of the second tag redirects the second user device to a template.

21. The method of claim 16 wherein the scanning of the second tag by the second user device defines the time, wherein a database defines the time and the unique ID and deploys the correct template to the second user device.

22. The method of claim 16 wherein a third user device scans the second tag and wherein the third user device is pushed information relating to an owner of the second tag.

23. The method of claim 16 wherein the second tag is on a student ID and wherein the unique ID is associated with a resource record for a unique tag ID associated with an MRC on the student ID.

* * * * *